(12) United States Patent
York et al.

(10) Patent No.: US 11,267,955 B2
(45) Date of Patent: Mar. 8, 2022

(54) POLYMER NETWORK FORMING SILANE COMPOSITIONS

(71) Applicant: Momentive Performance Materials Inc., Waterford, NY (US)

(72) Inventors: William Michael York, New Fairfield, CT (US); Adeyemi Adedayo Adepetun, Charlotte, NC (US); Lesley Hwang, Chappaqua, NY (US); Eric Pohl, Mount Kisco, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 323 days.

(21) Appl. No.: 16/674,713

(22) Filed: Nov. 5, 2019

(65) Prior Publication Data

US 2020/0140662 A1 May 7, 2020

Related U.S. Application Data

(60) Provisional application No. 62/755,619, filed on Nov. 5, 2018.

(51) Int. Cl.
| | |
|---|---|
| *C08L 7/00* | (2006.01) |
| *B60C 1/00* | (2006.01) |
| *B60C 11/00* | (2006.01) |
| *C07F 7/18* | (2006.01) |
| *C08J 3/20* | (2006.01) |
| *C09C 1/30* | (2006.01) |

(52) U.S. Cl.
CPC .............. *C08L 7/00* (2013.01); *B60C 1/0016* (2013.01); *B60C 11/0008* (2013.01); *C07F 7/1804* (2013.01); *C08J 3/203* (2013.01); *C09C 1/3081* (2013.01); *B60C 2011/0025* (2013.01); *C08L 2205/03* (2013.01); *C08L 2312/00* (2013.01)

(58) Field of Classification Search
CPC ...... C08L 7/00; C08L 2312/00; B60C 1/0016; C07F 7/1804; C08K 5/3492
USPC ......................................................... 524/100
See application file for complete search history.

(56) References Cited

U.S. PATENT DOCUMENTS

| | | | |
|---|---|---|---|
| 2001/0056139 A1 | 12/2001 | Krafczyk et al. | |
| 2004/0214017 A1* | 10/2004 | Uhlianuk ............. | C09D 161/32 428/447 |
| 2005/0277717 A1 | 12/2005 | Joshi et al. | |
| 2014/0350277 A1* | 11/2014 | Backer ................... | C08K 5/548 556/423 |

FOREIGN PATENT DOCUMENTS

WO    9640827 A1    12/1996

OTHER PUBLICATIONS

International Search Report and Written Opinion from PCT/US20119/059766 dated Apr. 1, 2020.
LiangLiang Qu et al. "Effect of Filler-elastomer Interactions on the Mechanical and Nonlinear Viscoelastic Behaviors of Chemically Modified Silica-reinforced Solution-polymerized Styrene Butadiene Rubber", Journal of Applied Polymer Science, vol. 126, No. 1, Mar. 23, 2012 (Mar. 23, 2012), pp. 116-126, XP055181938, ISSN: 0021-8995, DOI: 10.1002/app. 36677 p. 117.

* cited by examiner

*Primary Examiner* — Doris L Lee
(74) *Attorney, Agent, or Firm* — James C. Abruzzo

(57) ABSTRACT

A silane based additive, rubber formulations including the additive and tires having tread portions made with the additive, together with methods of forming those products, are provided. Uncured rubber formulations in accordance with preferred embodiments of the invention comprise (1) a rubbery primary polymer or polymer blend, such as natural rubber and/or synthetic rubber; (2) reinforcing silica filler; (3) a network forming monomer or polymer, especially a thermosetting network forming moiety, for forming a secondary polymeric network; and (4) a silane containing one or more moieties of the aforementioned network forming polymer. In particular networks which can be generated in-situ are preferred. The cured rubber formulation should comprise the silica, having the secondary polymer network coupled thereto, within the rubber matrix, and not directly to the rubber chains via sulfidic linkages.

29 Claims, 3 Drawing Sheets

POLYMER NETWORK FORMING SILANE COMPOSITIONS

CROSS REFERENCE TO RELATED APPLICATIONS

This application claims the benefit of priority to provisional Application Ser. No. 62/755,619, filed Nov. 5, 2018, the entire contents of which are incorporated herein by reference.

FIELD OF THE INVENTION

The invention relates generally to hydrolyzable silanes, polymer network-forming hydrolyzable silane compositions, processes for their preparation and rubber compositions containing the same.

BACKGROUND OF THE INVENTION

Carbon black has been the preeminent filler choice in truck tires. U.S. Pat. No. 6,608,132, incorporated herein by reference in its entirety, indicates that the particle size and structure of carbon black can affect certain key performance properties of tires, such as tread wear, rolling resistance, heat buildup and tear resistance.

While the high structure and high surface area of carbon black can enhance the wear resistance and tear resistance, these characteristics commonly lead to highly hysteretic tire compounds. Hysteresis can adversely affect rolling resistance and as a result negatively impact fuel usage per mile travelled. Regulatory drivers, which include Corporate Average Fuel Economy (CAFE) standards, Green House Gas (GHG) regulations, Environmental Protection Agency (EPA) regulations and European Tire Labelling regulations, have put a premium on energy savings. As a result, tire manufacturers are increasingly striving to make tires with lower rolling resistance while maintaining tire wear and traction (handling) properties. The trade-offs between wear resistance, rolling resistance and traction, when rubber compositions use conventional carbon black filler, particularly in truck, heavy vehicles and bus tire applications, has created a need for technologies that achieve an improved balance in rolling resistance, wear and traction (handling) properties.

According to U.S. Pat. No. 5,227,425, incorporated herein by reference in its entirety, tire tread compositions were disclosed in which the rubber component was a copolymer of a conjugated diene and a vinyl-containing aromatic compound which was prepared in solution and in which the carbon black filler was partially or completely replaced with silica and a silane coupling agent.

U.S. Pat. No. 6,046,266, incorporated herein by reference in its entirety, disclosed tire tread compositions in which the rubber was a mixture comprising natural or synthetic cis 1,4-polyisoprene rubber and cis 1,4-polybutadiene rubber, and the filler was a mixture of carbon black filler and precipitated silica filler. Each of the rubber components had a defined glass transition temperature and were used within defined ranges. The tire tread composition contained a silane coupling agent and was prepared with a prescribed order of addition of the fillers.

U.S. Pat. No. 5,396,940, incorporated herein by reference in its entirety, disclosed tire tread compositions in which the rubber was a mixture comprising epoxidized natural rubber and cis-1,4-polyisoprene and the carbon black filler was partially or completely replaced with a silica filler and a silane coupling agent.

P. J. Martin et al., Rubber Chemistry and Technology vol. 88, page 390 (2015) compared a truck tire formulation containing natural rubber, butadiene rubber and carbon black filler with a similar formulation where the carbon black filler was replaced with silica filler and a silane coupling agent.

M. Wang et al., Rubber Chemistry and Technology vol. 74, page 124 (2001), incorporated herein by reference in its entirety, discussed the replacement of carbon black filler or silica filler in rubber compositions with a carbon-silica dual phase filler. The carbon-silica dual phase filler had particles in which individual particles contained a silica phase finely dispersed in a carbon phase. The carbon phase may contain minor constituents of hydrogen and oxygen.

The partial or total substitution of carbon black filler in rubber composition with silica filler or a carbon-silica dual phase filler and the optimization of the formulations through choice of rubber or mixture of rubbers and/or processing are known. The rubber compositions containing silica filler or carbon-silica dual phase filler may be chemically coupled to the rubber polymers using silane coupling agents. The chemical coupling of the rubber with the filler often results in significant tradeoffs between rolling resistance, wear and/or traction (handling).

Accordingly, there remains a need to provide rubber compositions having an improved balance of low hysteretic properties (low rolling resistance), wear properties and traction (handling), which may be used in the fabrication of tires and other rubber goods, especially specialty tires, heavy vehicle tires, bus tires and truck tires.

SUMMARY OF THE INVENTION

In accordance with the present invention, a hydrolyzable alkoxymethylamino-functional silane used as a rubber composition additive is provided. Also provided are uncured rubber compositions containing the hydrolyzable alkoxymethylamino-functional silane additive, and cured rubber compounds and tires having portions, including tread portions, made from said uncured rubber compounds containing hydrolyzable alkoxymethylamino-functional silane additives. Also provided are methods of forming those products. Uncured rubber compositions in accordance with preferred embodiments of the invention can comprise (a) a rubbery polymer, such as natural rubber, synthetic rubber and a blend of polymers and copolymers, for forming a primary polymeric network; (b) a reinforcing filler that is reactive with a hydrolyzable alkoxymethylamino-functional silane; (c) a secondary network forming organic resin, especially a thermosetting network forming monomer, oligomer or polymer, for forming a secondary polymeric network; and (d) a hydrolyzable alkoxymethylamino-functional silane. Compositions in accordance with the invention can also optionally include (e) an active hydrogen containing organic compound capable of reacting with one or more moieties of the secondary network forming organic resin (c) and/or the hydrolyzable alkoxymethylamino-functional silane (d). Compositions in accordance with the invention can also optionally include an active hydrogen containing organic compound (e) or mixtures of organic resin (c) and an active hydrogen containing organic compound (e) thereof; and optionally (f) a sulfur-donating compound capable of reacting with the rubbery polymer (a) to form a crosslinked primary polymeric network.

In an embodiment of the invention, the primary and secondary polymer networks can be generated in-situ. The cured rubber formulation comprises a reinforcing filler (b), preferably silica, capable of reacting with the hydrolyzable alkoxymethylamino-functional silane (d), and having the secondary polymer network coupled thereto, by means of the hydrolyzable alkoxymethylamino-functional silane additive, within the primary polymer rubber matrix. In an embodiment of the invention, the secondary polymer network is formed from the network forming organic resin (c), and the hydrolyzable alkoxymethylamino-functional silane (d) and optionally active hydrogen-containing compound (e), where the secondary polymer network is not bonded directly to the rubber chains via sulfidic linkages.

Tires, especially tires sized, constructed and otherwise adapted to be used as heavy vehicle tires, passenger tires, truck tires, bus tires or specialty tires, with tread portions formulated in accordance with the invention, can be filled with silica and carbon black, or even no carbon black. The tire tread can exhibit improvement in wear resistance when compared to similar tire tread formulations that do not contain the secondary polymer network forming components (b), (c), (d) and/or (e). The hydrolyzable alkoxymethylamino-functional silane (d) is capable of reacting with one or more moieties of the other aforementioned secondary network forming components.

In one embodiment of the invention, the tire tread formulations of the present invention may provide for at least 90% or more, or even 100% or more of the wear resistance of a tire tread portion having the same or essentially the same composition, except that the reinforcing filler is silica when compared to tire tread formulations containing 100% carbon black filler and no silica filler, including when driven for 500, 1000 or more miles. These advantages can be achieved when the secondary polymer network is coupled to the silica filler.

Accordingly, it is an object of the invention to provide a hydrolyzable alkoxymethylamino-functional silane used as an additive, rubber composition including the alkoxymethylamino-functional silane, tires or tire components made from said rubber compositions and methods of forming the above.

Still other objects of the invention will in part be obvious and will, in part be apparent from the specification and the scope of the invention will be indicating the claims.

BRIEF DESCRIPTION OF THE DRAWINGS

In the drawings, which are merely illustrative.

DETAILED DESCRIPTION OF THE INVENTION

Figure 1:
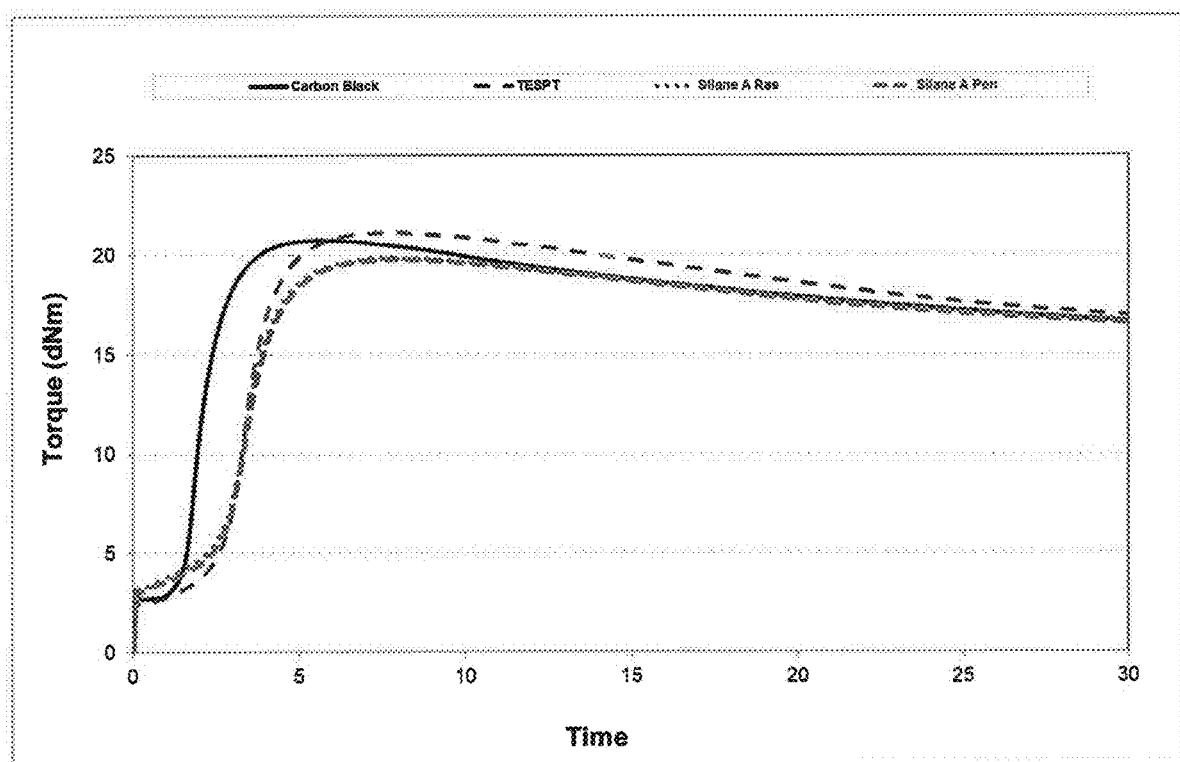
FIG. 1 is a graph of the change of torque with time, showing, inter alia, that the scorch safety and cure behavior of Silane A is comparable to that of TESPT.

Vehicle tires, including heavy vehicles, passenger tires, truck tires, bus tires or specialty tires, are typically multi-component constructions. For example, most tires include a tire casing, which acts as the body of the tire. Many tire casings are one or two body plies. The tire casing can incorporate fabric of steel, polyester, nylon or rayon cords within the casing rubber compound. A belt system can be disposed on top of (outside) the casing portion in the tire construction process. A tread slab or cap portion can be disposed on top of (outside) the belt system and/or casing. The tread portion contacts the road and is formulated to enhance the performance properties and durability of the tire. Key properties include handling, traction, rolling resistance and wear resistance.

In the specification and claims herein, the following terms and expressions are to be understood as indicated.

The singular forms "a," "an," and "the" include the plural, and reference to a particular numerical value includes at least that particular value, unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about".

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including" "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be understood that any numerical range recited herein includes all sub-ranges within that range and any combination of the various endpoints of such ranges or sub-ranges.

As used herein, integer values of stoichiometric subscripts refer to molecular species and non-integer values of stoichiometric subscripts refer to a mixture of molecular species on a molecular weight average basis, a number average basis or a mole fraction basis.

In the description that follows, all weight percents are based upon total weight percent of the organic material(s) unless stated otherwise and all ranges given herein comprise all subranges therebetween and any combination of ranges and/or subranges therebetween.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon group" or "hydrocarbon radical" means any hydrocarbon composed of hydrogen and carbon atoms from which one or more hydrogen atoms has been removed and is inclusive of alkyl, alkenyl, alkynyl, cycloalkyl, cycloalkenyl, cycloalkynyl, aryl, aralkyl and arenyl groups. Groups can be composed of hydrocarbon groups containing at least one heteroatom and more specifically, a hydrocarbon group containing at least one heteroatom of oxygen, nitrogen or sulfur.

The term "alkyl" means any monovalent, saturated straight chain or branched chain hydrocarbon group; the term "alkenyl" means any monovalent straight chain or branched chain hydrocarbon group containing one or more carbon-carbon double bonds where the site of attachment of the group can be either at a carbon-carbon double bond or elsewhere therein; and, the term "alkynyl" means any monovalent straight chain or branched chain hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

Rubbery Polymer (a)

A "rubbery polymer", as used herein, is an organic polymer containing at least two carbon-carbon double bonds and a backbone comprising a chain or chains of carbon atoms, or mixtures thereof. In one embodiment of the invention, rubbery polymer (a) can be at least one member selected from the group consisting of diene based elastomers and rubbers. Rubbery polymer (a) can be any of those that are well known in the art and are described in numerous texts, of which two examples, which are incorporated by reference herein, include The Vanderbilt Rubber Handbook; R. F. Ohm, ed.; R.T. Vanderbilt Company, Inc., Norwalk, Conn.; 1990 and Manual For The Rubber Industry; T. Kempermann, S. Koch, J. Sumner, eds.; Bayer AG, Leverkusen, Germany; 1993.

Some representative non-limiting examples of suitable rubbery polymer (a), the rubber component of the composition, include those selected from the group consisting of natural rubber (NR), synthetic polyisoprene (IR), polybutadiene (BR), various copolymers of butadiene, the various copolymers of isoprene, solution styrene-butadiene rubber (SSBR), emulsion styrene-butadiene rubber (ESBR), ethylene-propylene terpolymers (EPDM), acrylonitrile-butadiene rubber (NBR) and combinations thereof. It is understood that natural rubber (NR) includes rubber from various natural plant sources, including but not limited to, rubber trees, dandelions, guayule, and other sources.

Suitable monomers for preparing the rubbery polymers herein can be selected from the group consisting of conjugated dienes such as the non-limiting examples of isoprene and 1,3-butadiene; and suitable vinyl aromatic compounds, such as the non-limiting examples of styrene and alpha methyl styrene; and combinations thereof. Rubbery polymers can be a sulfur curable rubber. The diene based elastomers, or rubbers, can be selected, to be at least one of cis-1,4-polyisoprene rubber, including natural rubber and synthetic polyisoprene rubber, and more specifically natural rubber, emulsion polymerization-prepared styrene/butadiene copolymer rubber, organic solution polymerization-prepared styrene/butadiene rubber, 3,4-polyisoprene rubber, isoprene/butadiene rubber, styrene/isoprene/butadiene terpolymer rubber, cis-1,4-polybutadiene, medium vinyl polybutadiene rubber (35-50 percent vinyl), high vinyl polybutadiene rubber (50-75 percent vinyl), styrene/isoprene copolymers, emulsion polymerization-prepared styrene/butadiene/acrylonitrile terpolymer rubber and butadiene/acrylonitrile copolymer rubber. Emulsion polymerization-derived styrene/butadiene rubbers (ESBR) are also contemplated as diene-based rubbers for use herein including those having a relatively conventional styrene content of 20 to 28 percent bound styrene or, for some applications, ESBR's having a medium to relatively high bound styrene content, namely, a bound styrene content of 30 to 45 percent. Emulsion polymerization-prepared styrene/butadiene/acrylonitrile terpolymer rubbers containing 2 to 40 weight percent bound acrylonitrile in the terpolymer are also contemplated as diene based rubbers for use herein.

The rubbery polymers (a) can also be functionalized rubbers. Functionalized rubbers are rubbers modified by at least one functional group containing an atom other than carbon or hydrogen. The functional groups are typically alkoxysilyl groups, tin-containing groups, amino groups, hydroxyl groups, carboxylic acid groups, polysiloxane groups, epoxy groups, and the like, or combinations of these functional groups. The functional groups can be introduced into the rubbery polymer during the preparation of the synthetic rubber by co-polymerizing the monomers used to make the rubber with a monomer containing the functional group. Alternatively, the rubber polymers (a) can be modified with the functional group by grafting the functional group onto the already formed rubbery polymer.

The functionalized rubbery polymer can be used in combination with other non-functionalized rubbery polymers. The mixture can contain at least about 5 to about 95 parts per hundred parts rubber of at least one styrene-butadiene rubber, which is functionalized with at least one group selected from phthalocyanino, tin-containing groups, hydroxyl, epoxy, carboxylate, amino, alkoxysilyl and sulfido groups, where the styrene content is 0 to about 12 weight percent, and from about 5 to about 95 parts per hundred rubber of at least one further rubbery polymer. The functionalized rubbery polymers (rubber) generally have a glass transition temperature ($T_g$) according to DSC of −75 to −120° C. in the unvulcanized state.

In another embodiment of the invention, rubbery polymer (a) can be a diene polymer functionalized or modified by an alkoxysilane derivative. Silane-functionalized organic solution polymerization-prepared styrene-butadiene rubber and silane-functionalized organic solution polymerization-prepared 1,4-polybutadiene rubbers may be used. These rubber compositions are known; see, for example, U.S. Pat. No. 5,821,290 the entire contents of which are incorporated by reference herein.

In yet another embodiment of the invention, rubbery polymer (a) is a diene polymer functionalized or modified by a tin derivative. Tin-coupled copolymers of styrene and butadiene may be prepared, for example, by introducing a tin coupling agent during the styrene and 1,3-butadiene monomer copolymerization reaction in an organic solvent solution, usually at or near the end of the polymerization reaction. Such tin-coupled styrene-butadiene rubbers are well known to those skilled in the art; see, for example, U.S. Pat. No. 5,268,439, the entire contents of which are incorporated by reference herein. In practice, at least about 50 percent, and preferably from about 60 to about 85 percent, of the tin is bonded to the butadiene units of the styrene-butadiene rubbers to create a tin-dienyl bond.

Properties of natural rubber (NR) are particularly useful in the manufacture of heavy vehicle tires, bus tires and truck tires. One important reason for this is due to natural rubber's high content of cis-1,4-polyisoprene and its ability to undergo strain-induced crystallization. In one embodiment of the invention, rubbery polymer (a) comprises natural rubber, or mixtures of natural rubber and synthetic rubbers. Preferably, when the rubbery polymer (a) is a mixture of rubbers, natural rubber should comprise at least about 10 parts of natural rubber per hundred parts rubber, preferably about 30 parts natural rubber per hundred parts rubber, more preferably at least about 50 parts natural rubber per hundred parts rubber, and still even more preferably at least about 70 parts natural rubber per hundred parts rubber.

Reinforcing Fillers (b)

Uncured rubber compositions containing the hydrolyzable alkoxymethylamino-functional silane in accordance with the present invention preferably comprise a reinforcing filler (b). Reinforcing fillers (b) should be materials whose moduli are higher than rubbery polymers (a) of the rubber composition and should be capable of absorbing stress when the cured rubber composition is strained. Reinforcing fillers (b) can be materials which are reactive with the hydrolyzable alkoxymethylamino-functional silane (d) and can include fibers, particulates and sheet-like structures. They can be composed of inorganic minerals, silicates, silica, clays, ceramics and diatomaceous earth. The reinforcing fillers that are reactive with alkoxymethylamino-functional silane (d) can be a discrete particle or group of particles in the form of aggregates or agglomerates. The alkoxymethylamino-functional silane (d) can be reactive with the surface of the filler. Particulate precipitated silica can be useful as reinforcing filler that is reactive with the alkoxymethylamino-functional silane (d), particularly when the silica has reactive surface silanols. The silicas may be provided in a hydrated form or be converted to a hydrated form by reaction with water. The reinforcing filler (b) can be used in the amount of from 1 to 150 parts reinforcing filler (b) per 100 parts of the rubbery polymer (a), more specifically from 25 to 90 parts reinforcing filler (b) per 100 parts of the rubbery polymer (a) and more specifically from 40 to 80 parts reinforcing filler (b) per 100 parts of the rubber polymer (a).

Representative non-limiting examples of reinforcing fillers (b) that are reactive with alkoxymethylamino-functional silane (d) include at least one metalloid oxide or metal oxide such as pyrogenic silica, precipitated silica, titanium dioxide, aluminosilicate, alumina and siliceous materials including clays and talc and combinations thereof.

In specific embodiment herein, reinforcing filler (b) which is reactive with the alkoxymethylamino-functional silane (d) is a silica used alone or in combination with one or more other fillers, e.g., organic and/or inorganic fillers that do not react with alkoxymethylamino-functional silane (d). A representative non-limiting example is the combination of silica and carbon black, such as for reinforcing fillers for various rubber products, including the non-limiting example of treads for tires. Alumina can be used either alone or in combination with silica. The term "alumina" herein refers to aluminum oxide, or $Al_2O_3$. Use of alumina in rubber compositions is known; see, for example, U.S. Pat. No. 5,116, 886 and EP 631 982, the entire contents of both of which are incorporated by reference herein.

Reinforcing fillers (b) that are reactive with the alkoxymethylamino-functional silane (d) can be used as a carrier for the alkoxymethylamino-functional silane (d). Other fillers that can be used as carriers are non-reactive with alkoxymethylamino-functional silane (d). The non-reactive nature of the fillers is demonstrated by the ability of alkoxymethylamino-functional silane (d) to be extracted at greater than 50 percent of the loaded silane using an organic solvent. The extraction procedure is described in U.S. Pat. No. 6,005,027, the entire contents of which are incorporated by reference herein. Representative of non-reactive carriers include, but are not limited to, porous organic polymers and carbon black. The amount of alkoxymethylamino-functional silane (d) that can be loaded on the carrier is preferably between 0.1 and 70 percent and more preferably between 10 and 50 percent, based on the total weight of the carrier and alkoxymethylamino-functional silane (d).

In one non-limiting embodiment of the invention, the other fillers that may be mixed with reinforcing filler that is reactive with the alkoxymethylamino-functional silane (d) can be essentially inert to the alkoxymethylamino-functional silane (d) with which they are admixed as is the case with carbon black or organic polymers. In another embodiment, at least two reinforcing fillers that are reactive with alkoxymethylamino-functional silane (d) can be mixed together and can be reactive therewith. Reinforcing fillers that possess metalloid hydroxyl surface functionality, such as silicas and other siliceous particulates which possess surface silanol functionality, can be used in combination with reinforcing fillers containing metal hydroxyl surface functionality, such as alumina and other siliceous fillers.

In one embodiment of the invention, precipitated silica is utilized as reinforcing filler (b) that is reactive with alkoxymethylamino-functional silane (d). In a preferred embodiment of the invention, the silica fillers can be characterized by having a Brunauer, Emmett and Teller (BET) surface area, as measured using nitrogen gas, in the range of from about 40 to about 600 $m^2/g$, preferably in the range of from about 50 to about 300 $m^2/g$ and more preferably in the range of from about 100 to about 220 $m^2/g$. The BET method of measuring surface area, described in the *Journal of the American Chemical Society*, Volume 60, page 304 (1930), is the method used herein. In yet another preferred embodiment, the silica is typically characterized by having a dibutylphthalate (DBP) absorption value in a range of from about 100 to about 350, preferably from about 150 to about 300 and more preferably from about 200 to about 250. In other embodiments, reinforcing filler (b) that is reactive with the alkoxymethylamino-functional silane (d) is alumina and aluminosilicate fillers, and possess a CTAB surface area in the range of from about 80 to about 220 $m^2/g$. CTAB surface area is the external surface area as determined by cetyl trimethylammonium bromide with a pH of about 9; the method for its measurement is described in ASTM D 3849.

Mercury porosity surface area is the specific surface area determined by mercury porosimetry. In this technique, mercury is penetrated into the pores of the sample after a thermal treatment to remove volatiles. In a more specific embodiment, set-up conditions use a 100 milligram sample, remove volatiles over 2 hours at 105° C. and ambient atmospheric pressure and employ a measuring range of from ambient to 2000 bars pressure. Such evaluations can be performed according to the method described in Winslow, et al. in ASTM bulletin, p. 39 (1959) or according to DIN 66133; for such an evaluation, a CARLO-ERBA Porosimeter 2000 can be used. Particularly useful reinforcing fillers (b) that are reactive with the alkoxymethylamino-functional silane (d) include silica, which has an average mercury porosity specific surface area in a range of from about 100 to about 300 $m^2/g$, preferably from about 150 to about 275 $m^2/g$ and more preferably from about 200 to about 250 $m^2/g$.

Suitable pore size distribution for reinforcing filler (b) that are reactive with the alkoxymethylamino-functional silane (d) include the non-limiting examples of silica, alumina and aluminosilicate, according to such mercury porosity evaluation, is considered herein to be five percent or less of its pores having a diameter of less than 10 nm; from about 60 to about 90 percent of its pores having a diameter of from 10 to 100 nm; from about 10 to about 30 percent of its pores having a diameter of from 100 to 1,000 nm; and, from about 5 to about 20 percent of its pores having a diameter of greater than 1,000 nm. These reinforcing fillers (b) can normally be expected to have an average ultimate particle size in the range of from about 0.005 to about 0.075 µm, preferably of from about 0.01 to about 0.05 µm as determined by electron microscopy, although the particles can be smaller or larger in average size. Various commercially available silicas can be used herein such as those available from PPG Industries under the HI-SIL trademark, in particular, HI-SIL 210, and 243; silicas available from Solvay, e.g., ZEOSIL 1165 MP; silicas available from Evonik, e.g., VN2 and VN3, etc., and silicas available from Huber, e.g., HUBERSIL 8745.

In one embodiment of the invention, the filler can comprise a reinforcing filler (b) that is reactive with the alkoxymethylamino-functional silane (d) in the amount of from about 15 to about 95 weight percent precipitated silica, alumina and/or aluminosilicate, preferably silica and, correspondingly, from about 5 to about 85 weight percent carbon black having a CTAB value in a range of from about 80 to about 150, more preferably, the filler can comprise from about 60 to about 95 weight percent of said silica, alumina and/or aluminosilicate, preferably silica and, correspondingly, from about 40 to about 50 weight percent of carbon black. The precipitated silica, alumina and/or aluminosilicate filler and carbon black can be pre-blended or blended together during the manufacture of the vulcanized rubber.

Tire tread portions are conventionally formulated with carbon black filler. Carbon black provides tread portions with exceptional wear resistance, which leads to high mileage, long lasting tires. When silica is used as filler, it can form a silica-silica network during the tire manufacturing process. This network can interfere with tire properties, such as rolling resistance. Adding conventional silanes to tire formulations can reduce rolling resistance by limiting silica-silica network formation and immobilizing polymer chains on the silica surface. However, not wishing to be bound by theory, it is believed that silane bonding to the rubber chains via sulfur can increase the trans content of natural rubber, as discussed in J. I. Cuneen, Rubber Chemistry and Technology, vol. 33, page 445, 1960; and J. I. Cuneen and F. W. Shipley, Journal of Polymer Science, vol. 36, page 77, 1959. This likely adversely affects performance properties such as wear resistance. Furthermore, severely restricting chain mobility could affect the ability of natural rubber to undergo strain-induced crystallization and compromise wear resistance and tear resistance.

Secondary Polymer Network

It has been determined that the shortcomings of using conventional silanes in silica filled rubber formulations, particularly wear resistance, can be addressed by what is believed to be coupling the reinforcing filler (b) that is reactive with the alkoxymethylamino-functional silane (d), to a reinforcing "secondary polymeric network". This secondary polymer network is preferably formed in-situ within the rubber matrix and not bonded directly to the rubber chains of the primary polymer network via sulfidic linkages. The secondary polymeric network can be formed from secondary polymer network forming organic resins (c) or can be formed from secondary polymer network forming organic resins (c) and active hydrogen-containing compounds (e). These secondary polymer networks are preferably thermosetting resins that react with the alkoxymethylamino-functional silane (d) of the present invention.

Rolling resistance can be lowered by hydrophobating the silica. Increasing the effective filler volume promotes wear resistance and tear resistance. Furthermore, the secondary polymeric network can increase reinforcement and stiffness of the resulting tread under static and dynamic deformations.

This secondary polymer network polymerization is believed to grow from the reinforcing filler surface, especially silica surface, which has reacted with the alkoxymethylamino-functional silane (d). These alkoxymethylamino-functional silanes (d) can function as initiators or co-initiators during the rubber mixing and/or curing process. The resulting secondary polymer network may create additional points of physical and chemical chain entanglements for the rubber phase. These entanglements, along with the resulting secondary polymeric network and the silica, are believed to create a hierarchical structure whose modulus gradient is useful for load transfer from the rubbery polymer chains to the silica during static and dynamic deformation, thereby enhancing tear and wear resistance and reducing abrasion. The secondary polymer network polymerization from the filler surface can lead to the creation of a network structure on the filler surface and increases the effective filler volume. This network structure and effective filler volume result in additional reinforcement, which is also helpful for improved wear resistance.

Such polymeric networks are formed from secondary polymer network organic resins (c) and active hydrogen-containing compounds (e). These secondary polymer network forming organic resins (c) include polyisocyanates, polyisocyanurates, epoxy resins, amino resins and polyurethanes. Secondary polymer network forming active hydrogen-containing compounds (e) include, but are not limited to, polyols, polyamines, polyureas, polyamides, hydroxyl-containing polyacrylates, hydroxyl containing polymethacrylates, polycarboxylates, hydroxyl substituted alkyl, aryl, or alkylene groups, amine substituted alkyl, aryl, alkylene groups, thiol substituted alkyl, aryl or alkylene groups.

In one embodiment of the invention, the organic resins (c) are amino resins. The amino resins can be resins formed from the reaction of —NH containing compounds, formaldehyde and alcohol. More preferably, the amino resins are derived from 2,4,6-triamino-1,3,5-triazine, benzoguanamine, urea, glycoluril and poly(meth)acrylamide.

In one embodiment of the invention, the organic resins (c) have the chemical Formulae (VII), (VIII) or (IX):

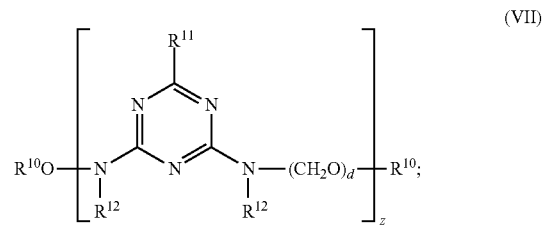

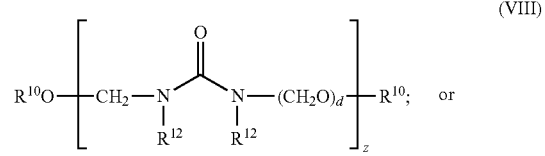

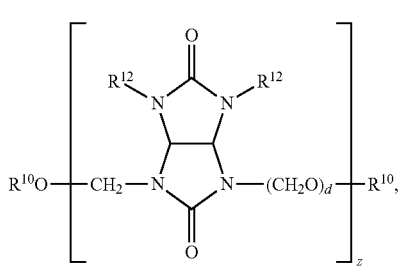

wherein each $R^{10}$ is independently an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms, an aralkyl group having from 7 to 12 carbon atoms or hydrogen, more preferably an alkyl group having from 1 to 3 carbon atoms or hydrogen and even more preferably methyl or ethyl;

each $R^{11}$ is independently phenyl, $—N(CH_2OR^{10})_2$ or $—NH(CH_2OR^{10})$;

each $R^{12}$ is independently hydrogen or $—CH_2OR^{10}$; and each d and z is an integer, where d is 0 or 1, more preferably 1, and z is from 1 to 40, more preferably 1 to 15, even more preferably 1 to 3. The organic resin (c) can be used in the amount of 0.1 to 30 parts organic resin (c) per 100 parts of rubbery polymer (a), more specifically from 0.2 to 15 parts organic resin (c) per 100 parts of rubbery polymer (a) and even more specifically from 0.3 to 10 parts organic resin (c) per 100 parts of rubbery polymer (a).

In one embodiment of the invention, $R^{10}$ is an alkyl group of from 1 to 5 carbon atoms, each $R^{11}$ and $R^{12}$ is independently $—N(CH_2OR^{10})_2$, d is 1 and z is 1 to 3.

In another embodiment, at least two $R^{10}$ groups are an alkyl group of from 1 to 3 carbon atoms, and at least one $R^{10}$ group is hydrogen.

In yet another embodiment, the amino resins have at least one $R^{12}$, which is hydrogen or $—CH_2OH$, and at least two $R^{12}$ which are $CH_2OR^{10}$, where $R^{10}$ is independently an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms.

Representative and non-limiting examples of the amino resins, also known as aminoplast resins, are 1,1,3,3-tetramethoxymethylurea, 1,3,3-tris-methoxymethylurea, 1,3-bis-methoxymethylurea, 1,1-bis-methoxymethylurea, 1,1,3,3-tetra-ethoxymethylurea, 1,3,3-tris-ethoxymethylurea, 1,3-bis-ethoxymethylurea, 1,1-bis-ethoxymethylurea, 1,1,3,3-tetra-propoxymethylurea, 1,3,3-tris-propoxymethylurea, 1,3-bis-propoxymethylurea, 1,1-bis-propoxymethylurea, 1,1,3,3-tetra-butoxymethylurea, 1,1,3,3-tetra-phenoxymethylurea, N-(1,3,3-tris-ethoxymethylureidomethyl)-1,1,3,3-tetra-ethoxymethylurea, N, N'-bis-(1,1,3-tris-ethoxymethylureidomethyl)-1,3-bis-ethoxymethylurea, N, N'-bis-(1,1,3-tris-ethoxymethylureido-methoxymethyl)-1,3-bis-ethoxymethylurea, N,N,N',N',N",N"-hexakis-methoxymethyl-[1,3,5]triazine-2,4,6-triamine, N,N,N',N',N"-pentakis-methoxymethyl-[1,3,5]triazine-2,4,6-triamine, N,N,N',N"-tetrakis-methoxymethyl-[1,3,5]triazine-2,4,6-triamine, N,N,N',N',N",N"-hexakis-ethoxymethyl-[1,3,5]triazine-2,4,6-triamine, N,N,N',N',N"-pentakis-ethoxymethyl-[1,3,5]triazine-2,4,6-triamine, N,N,N',N"-tetrakis-ethoxymethyl-[1,3,5]triazine-2,4,6-triamine, N,N,N',N',N",N"-hexakis-propoxymethyl-[1,3,5]triazine-2,4,6-triamine, N,N,N',N',N"-pentakis-propoxymethyl-[1,3,5]triazine-2,4,6-triamine, N,N,N',N"-tetrakis-propoxymethyl-[1,3,5]triazine-2,4,6-triamine, N,N,N',N',N",N"-hexakis-phenoxymethyl-[1,3,5]triazine-2,4,6-triamine, N,N,N',N',N"-pentakis-phenoxymethyl-[1,3,5]triazine-2,4,6-triamine, N,N,N',N"-tetrakis-phenoxymethyl-[1,3,5]triazine-2,4,6-triamine, 1,3,4,6-tetrakis-methoxymethyl-tetrahydro-imidazo[4,5-d]imidazole-2,5-dione, 1,3,4,6-tetrakis-ethoxymethyl-tetrahydro-imidazo[4,5-d]imidazole-2,5-dione, 1,3,4,6-tetrakis-propoxymethyl-tetrahydro-imidazo[4,5-d]imidazole-2,5-dione, 1,3,4,6-tetrakis-phenoxymethyl-tetrahydro-imidazo[4,5-d]imidazole-2,5-dione, 1,3,4-tris-ethoxymethyl-tetrahydro-imidazo[4,5-d]imidazole-2,5-dione, 1,4-bis-ethoxymethyl-tetrahydro-imidazo[4,5-d]imidazole-2,5-dione, 1,3,4,-tris-methoxymethyl-tetrahydro-imidazo[4,5-d]imidazole-2,5-dione and 1,3,4,-tris-phenoxymethyl-tetrahydro-imidazo[4,5-d]imidazole-2,5-dione.

The organic resin can be obtained commercially. For example, amino resins can be commercially purchased from PERFERE, formerly INEOS Melamine GmbH, under the tradenames, RESIMENE® 747 ULF, RESIMENE®755, RESIMENE®757, RESIMENE® 764, RESIMENE® CE 8824 ULF and MAPRENAL® UF 134/60B.

Hydrolyzable Alkoxymethylamino-Functional Silane (d)

The hydrolyzable alkoxymethylamino-functional silane (d) in accordance with the present invention, are organic compounds that contain at least one hydrolyzable silyl group and at least one, preferably at least two, alkoxymethylamino-functional groups in which alkoxymethylamino-functional groups are bonded to the rest of the organic compound to form a N—C covalent bond, where the carbon atom is $sp^2$ hybridized. The $sp^2$-hybridized carbon means that the carbon atom is bonded to three other atoms to form a planar structure, and also contains a p-orbital that is perpendicular to the plane form from the carbon atom and the three other atoms bonded to it. The $sp^2$-hybridized carbon includes for example $—\underline{C}(=C)—$, $—\underline{C}(=O)—$, $—\underline{C}(=N)—$ or $—\underline{C}(=S)—$, where the two hyphens represent chemical bonds to other atoms, and the underline carbon atom is the carbon atoms which is a $sp^2$-hybridized carbon atom.

In one embodiment of the present invention, the alkoxymethylamino-functional group has the chemical Formula (I):

where $R^1$ is independently hydrogen, an alkyl group having from 1 to 10 carbon atoms, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms, more preferably an alkyl group having from 1 to 3 carbon atoms and even more preferably methyl or ethyl, and the nitrogen atom is bonded to a $sp^2$-hybridized carbon atom.

The hydrolyzable alkoxymethylamino-functional silane in accordance with the present invention can also contain at least one hydrolyzable silyl group. In one embodiment of the invention, the silyl groups has the chemical Formula (II):

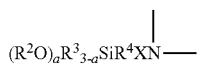

(II)

where each $R^2$ is independently hydrogen, an alkyl group having from 1 to 10 carbon atoms and optionally at least one oxygen atom, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, more preferably an alkyl group having from 1 to 3 carbon atoms and even more preferably ethyl; each $R^3$ is independently an alkyl group having from 1 to 3 carbon atoms or phenyl; $R^4$ is an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms, more preferably an alkylene group having from 1 to 6 carbon atoms, and even more preferably, a propylene; X is —SCH$_2$—, $R^1$OC(=O)NCH$_2$—, —NR$^1$C(=O)N(R$^1$)CH$_2$—, $R^1{}_2$N(C=O)NCH$_2$—, —NR$^1$(C=O)OCH$_2$—, —OCH$_2$—, —NR$^1$CH$_2$— or —OCH$_2$CH(OH)CH$_2$OCH$_2$— group, more preferably a —SCH$_2$— or —NR$^1$CH$_2$— group, and even more preferably —SCH$_2$—, where the methylene carbon atom of the group is bonded to the nitrogen atom, or —NH(C=O)—, —OCH$_2$CH(OH)CH$_2$— or a chemical bond which forms the bond between the $R^4$ group and the nitrogen atom shown in Formula (II); the subscript a is an integer where a is equal to 1, 2 or 3, and more preferably 3, with the proviso that the nitrogen atom shown in Formula (II) is bonded to a sp$^2$-hybridized carbon atom.

In another embodiment of the invention, the hydrolyzable alkoxymethylamino-functional silanes (d) in accordance with the present invention are derived from amino resins. The amino containing compounds useful in preparing the hydrolyzable alkoxymethylamino-functional silanes include, but are not limited to, 2,4,6-triamino-1,3,5-triazine, benzoguanamine, urea, glycoluril and copolymers of (meth)acrylamide. Amino resins are made by reacting the amino containing compounds with formaldehyde and subsequently with alcohols.

In still another embodiment of the invention, the hydrolyzable alkoxymethylamino-functional silanes (d) in accordance with the present invention have the chemical structures selected from the group consisting of structures having the general Formulae (III)-(V) or stereoisomers thereof:

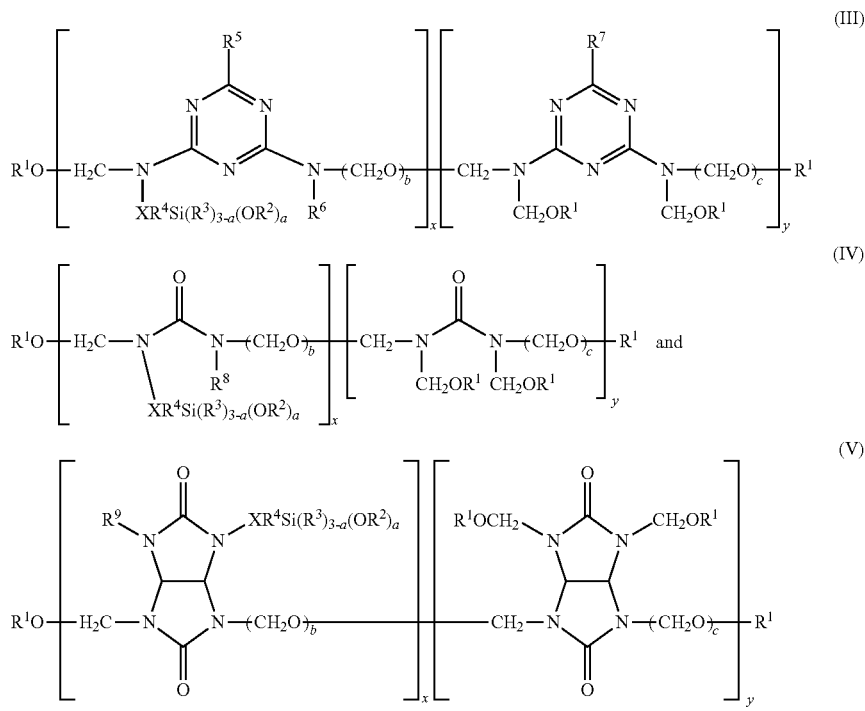

wherein
each $R^1$ is independently hydrogen, an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, preferably an alkyl group having from 1 to 3 carbon atoms and more preferably methyl;

each $R^2$ is independently hydrogen, an alkyl group having from 1 to 10 carbon atoms and optionally at least one oxygen atom, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, preferably an alkyl group having from 1 to 3 carbon atoms and more preferably ethyl;

each $R^3$ is independently an alkyl group having from 1 to 3 carbon atoms or phenyl;

each $R^4$ is independently an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms, preferably an alkylene group having from 1 to 6 carbon atoms, and more preferably, a propylene;

each $R^5$ and $R^7$ is independently phenyl, $—N(CH_2OR^1)_2$, $—N(CH_2OR^1)(XR^4Si(R^3)_{3-a}(OR^2)_a)$, $—N(XR^4Si(R^3)_{3-a}(OR^2)_a)_2$,

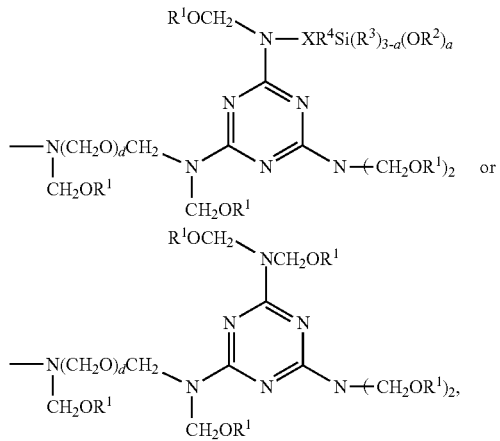

preferably $—N(CH_2OR^1)_2$ or $—N(CH_2OR^1)(XR^4Si(R^3)_{3-a}(OR^2)_a)$;

each $R^6$, $R^8$ and $R^9$ is independently hydrogen, $—CH_2OR^1$ or $—XR^4Si(R^3)_{3-a}(OR^2)_a$, more specifically $—CH_2OR^1$;

each X is independently $—SCH_2—$, $R^1OC(=O)NCH_2—$, $—NR^1C(=O)N(R^1)CH_2—$, $R^1{}_2N(C=O)NCH_2—$, $—NR^1(C=O)OCH_2—$, $—OCH_2—$,

or $—OCH_2CH(OH)CH_2OCH_2—$ group, more preferably a $—SCH_2—$ or $—NR^1CH_2—$ group, and even more preferably $—SCH_2—$, where the methylene carbon atom of the group is bonded to the nitrogen atom, or X is independently $—NH(C=O)—$, $—OCH_2CH(OH)CH_2—$ or a chemical bond which forms the bond between the $R^4$ group and the nitrogen atom, with the proviso that the nitrogen atom is bonded to a sp²-hybridized carbon atom; the subscripts a, b, c, d, x and y are independently integers where a is 1, 2 or 3, preferably 3; b is 0 or 1, more preferably 1; c is 0 or 1, preferably 1; x is from 1 to 20, preferably 1, 2 or 3; and y is from 0 to 20, preferably 0.

Representative and non-limiting examples of the hydrolyzable alkoxymethylamino-functional silane (d) include 1-(5-trimethoxysilyl-2-thiapentyl)-1,3,3-tris-methoxymethylurea, 1,3-bis-(1-(5-trimethoxysilyl-2-thiapentyl)-1,3-bis-methoxymethylurea, 3,3-bis-(3-dimethoxysilyl-2-thiapropyl)-1,1-bis-methoxymethylurea, 1-(5-triethoxysilyl-2-thiapentyl)-1,3,3-tetra-ethoxymethylurea, 1-(5-triethoxysilyl-2-aza-2-methyl-pentyl)-1,3,3-tris-ethoxymethylurea, 1,3-bis-(7-triethoxysilyl-2,4-diaza-3-oxo-heptyl)-1,3-bis-ethoxymethylurea, 3,3-bis-(1-(5-triethoxysilyl-2-thiapentyl)-1,1-bis-ethoxymethylurea, 1-(5-triethoxysilyl-2-thiapentyl)-1,3,3-tris-propoxymethylurea, 1-(5-triethoxysilyl-2-thiapentyl)-1,3,3-tris-propoxymethylurea, 1,3-bis-(5-tripropoxysilyl-2-thiapentyl)-1,3-bis-propoxymethylurea, 3,3-bis-(5-tripropoxysilyl-2-thiapentyl)-1,1-bis-propoxymethylurea, 1,3-bis-(5-tripropoxysilyl-2-thiapentyl)-1,3,3-tetra-butoxymethylurea, 1-(5-triphenoxysilyl-2-thiapentyl)-1,3,3-tetra-phenoxymethylurea, N-[1-(5-triethoxysilyl-2-thiapentyl)-1,3-tris-ethoxymethylureidomethyl]-1,3,3-tetra-ethoxymethylurea, N, N'-bis-[(1-(5-triethoxysilyl-2-thiapentyl)-1,3-bis-ethoxymethylureidomethyl]-1,3-bis-ethoxymethylurea, N, N'-bis-[1-(5-triethoxysilyl-2-thiapentyl)-1,3-bis-ethoxymethylureido-methoxymethyl]-1,3-bis-ethoxymethylurea, N-(5-triethoxysilyl-2-thiapentyl)-N,N',N',N'',N''-pentakis-methoxymethyl-[1,3,5]triazine-2,4,6-triamine, N, N''-bis-(5-triethoxysilyl-2-thiapentyl)-N,N',N',N''-tetrakis-methoxymethyl-[1,3,5]triazine-2,4,6-triamine, N',N''-(5-triethoxysilyl-2-thiapentyl)-N,N,N',N''-tetrakis-methoxymethyl-[1,3,5]triazine-2,4,6-triamine, N-(5-triethoxysilyl-2-aza-2-methyl-pentyl)-N,N,N',N',N'',N''-pentakis-ethoxymethyl-[1,3,5]triazine-2,4,6-triamine, N''-(7-triethoxysilyl-2,4-diaza-3-oxo-heptyl)-N,N,N',N',N''-pentakis-ethoxymethyl-[1,3,5]triazine-2,4,6-triamine, N',N''-(7-triethoxysilyl-2,4-diaza-3-oxo-heptyl)-N,N,N',N''-tetrakis-ethoxymethyl-[1,3,5]triazine-2,4,6-triamine, N-(5-triethoxysilyl-2-aza-2-methyl-pentyl)-N,N',N',N'',N''-pentakis-propoxymethyl-[1,3,5]triazine-2,4,6-triamine, N-(5-triethoxysilyl-2-aza-2-methyl-pentyl)-N,N',N',N'',N''-pentakis-phenoxymethyl-[1,3,5]triazine-2,4,6-triamine, 1-(5-triethoxysilyl-2-thia-pentyl)-3,4,6-tris-methoxymethyl-tetrahydro-imidazo[4,5d]imidazole-2,5-dione, 1-(5-triethoxysilyl-2-aza-2-methyl-pentyl)-3,4,6-triethoxymethyl-tetrahydro-imidazo[4,5-d]imidazole-2,5-dione, 3,6-bis-(5-triethoxysilyl-2-thia-pentyl)-1,4-bis-ethoxymethyl-tetrahydro-imidazo[4,5-d]imidazole-2,5-dione, 6-(5-triethoxysilyl-2-aza-2-methyl-pentyl)-1,3,4,-tris-methoxymethyl-tetrahydro-imidazo[4,5-d]imidazole-2,5-dione and 6-(5-triethoxysilyl-2-thia-pentyl)-1,3,4,-tris-phenoxymethyl-tetrahydro-imidazo[4,5-d]imidazole-2,5-dione, preferably 1-(5-trimethoxysilyl-2-thiapentyl)-1,3,3-tris-methoxymethylurea, N-[1-(5-triethoxysilyl-2-thiapentyl)-1,3-tris-ethoxymethylureidomethyl]-1,3,3-tetra-ethoxymethylurea, N-(5-triethoxysilyl-2-thiapentyl)-N,N',N',N'',N''-pentakis-methoxymethyl-[1,3,5]triazine-2,4,6-triamine, N, N''-bis-(5-triethoxysilyl-2-thiapentyl)-N,N',N',N''-tetrakis-methoxymethyl-[1,3,5]triazine-2,4,6-triamine, N',N''-(5-triethoxysilyl-2-thiapentyl)-N,N,N',N''-tetrakis-methoxymethyl-[1,3,5]triazine-2,4,6-triamine, N-(5-triethoxysilyl-2-aza-2-methyl-pentyl)-N,N',N',N'',N''-pentakis-ethoxymethyl-[1,3,5]triazine-2,4,6-triamine and 1-(5-triethoxysilyl-2-thia-pentyl)-3,4,6-tris-methoxymethyl-tetrahydro-imidazo[4,5-d]imidazole-2,5-dione.

In one embodiment of the invention, the hydrolyzable alkoxymethylamino-functional silane is formed by combining a silane containing a functional group with an amino resin. The amino resin may be a component in the secondary polymer network forming organic resin (c). The hydrolyzable alkoxymethylamino-functional silane (d) can be formed prior to addition of the hydrolyzable alkoxymethylamino-functional silane (d) to the rubber composition. The hydrolyzable alkoxymethylamino-functional silane (d) can be used in the amounts of from 0.1 to 30 parts hydrolyzable alkoxymethylamino-functional silane (d) per 100 parts of the rubbery polymer (a), more specifically, from 0.5 to 15 parts hydrolyzable alkoxymethylamino-functional silane (d) per 100 parts rubbery polymer (a) and even more specifically from 1 to 10 parts hydrolyzable alkoxymethylamino-functional silane (d) per 100 parts of the rubbery polymer (a). Alternatively, the silane containing a functional group can be added to a rubber composition containing the amino resin (c) which may be used to form the secondary polymer network, to generate the hydrolyzable alkoxymethylamino-functional silane (d) in situ. When the hydrolyzable alkoxymethylamino-functional silane (d) is generated in situ, the silane containing a functional group can be used in the amounts of amount of 0.1 to 30 parts silane containing a functional group per 100 parts of rubbery polymer (a), more specifically from 0.2 to 15 parts silane containing a functional group per 100 parts of rubbery polymer (a) and even more specifically from 0.3 to 10 parts silane containing a functional group per 100 parts of rubbery polymer (a) and the organic resin can be use in the amount of 0.2 to 35 parts organic resin (c) per 100 parts of rubbery polymer (a), more specifically from 0.4 to 15 parts organic resin (c) per 100 parts of rubbery polymer (a) and even more specifically from 1 to 10 parts organic resin (c) per 100 parts of rubbery polymer (a).

In another embodiment of the invention, the hydrolyzable alkoxymethylamino-functional silane (d) is prepared by the following process:

(i) contacting an amino resin having the structure of general Formula (VII), (VIII) or (IX), where $R^{12}$ is —$CH_2OR^{10}$, with a silane containing a functional group having the general Formula (X):

$$(R^2O)_aR^3_{3-a}SiR_4X^1H \quad (X)$$

wherein each $R^2$ is independently hydrogen, an alkyl group having from 1 to 10 carbon atoms and optionally at least one oxygen atom, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, preferably an alkyl group having from 1 to 3 carbon atoms and more preferably ethyl;

each $R^3$ is independently an alkyl group having from 1 to 3 carbon atoms or phenyl;

$R^4$ is an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms, preferably an alkylene group having from 1 to 6 carbon atoms, and more preferably, a propylene;

$X^1$ is —O—, —S—, —$NR^{13}$—, —$NR^{13}C(=O)NR^3$—, —where $R^{13}$ is hydrogen, an alkyl group having from 1 to 10 carbon atoms and optionally at least one oxygen atom, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, preferably hydrogen or an alkyl group having from 1 to 3 carbon atoms and more preferably a hydrogen;

a is an integer equal to 0, 1 or 2, or contacting an amino resin having the structure of general Formula (VII), (VIII) or (IX), where at least one $R^{12}$ is hydrogen or —$CH_2OH$, with a silane containing a functional group having the general Formula (XI):

$$(R^2O)_aR^3_{3-a}SiR_4X^2 \quad (XI)$$

wherein each $R^2$ is independently hydrogen, an alkyl group having from 1 to 10 carbon atoms and optionally at least one oxygen atom, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, preferably an alkyl group having from 1 to 3 carbon atoms and more preferably ethyl;

each $R^3$ is independently an alkyl group having from 1 to 3 carbon atoms or phenyl;

$R^4$ is an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms, preferably an alkylene group having from 1 to 6 carbon atoms, and more preferably, a propylene;

$X^2$ is —Cl, —Br,

—N=C=O, —$NR^{13}C(=O)NR^{13}_2$ or —$NR^{13}C(=O)OR^{13}$ where $R^{13}$ is hydrogen, an alkyl group having from 1 to 10 carbon atoms and optionally at least one oxygen atom, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms, preferably hydrogen or an alkyl group having from 1 to 3 carbon atoms and more preferably a hydrogen;

a is an integer equal to 0, 1 or 2;

(ii) reacting the amino resin of step (i) with the silane containing a functional group of step (i); and, optionally (iii) removing the byproducts selected from the group $R^{10}OH$, $R^{13}OH$, $R^{13}_2NH$, HCl or HBr from the reaction mixture if the byproduct is formed in the reaction.

The molar ratio of the —$X^1H$ group to the

group or the —$X^2$ to $R^{12}$ group is from about

to 0.8, preferably, from 0.2 to 0.5. The reaction product, the hydrolyzable alkoxymethylamino-functional silane (d), has at least one $(R^2O)_aR^3_{3-a}SiR_4X$— group and at least two $R^{10}OCH_2N$— groups or has at least one $(R^2O)_aR^3_{3-a}SiR_4X$— group and at least one $(R^{10}OCH_2)_2N$— group.

Representative an non-limiting examples of silane contain a functional group of Formula (X) include 3-mercaptopropyltrimethoxysilane, 3-mercaptopropyltriethoxysilane, 3-mercaptopropyltripropoxysilane, 3-mercaptopropyldimethoxyethoxysilane, 3-mercaptopropylmethyldiethoxysilane, 3-mercaptopropyldimethylethoxysilane, mercaptomethyltriethoxysilane, 4-mercapto-3,3-dimethylbutyltriethoxysilane, 3-mercaptopropylethoxy-[1,3,2]dioxasilinane, 3-mercaptopropyl-(3-hydroxy-2-methylpropoxy)-5-methyl-[1,3,2]dioxasilinane, 6-mercaptohexyltriethoxysilane, 3-aminopropyltriethoxysilane, N-ethyl-3-aminopropyltriethoxysilane, N-methyl-3-aminopropyltriethoxysilane, N-ethyl-3,3-dimethyl-4-aminobutyltriethoxysilane, n-phenyl-3-aminopropyltriethoxysilane, 3-ureidopropyltriethoxysilane, 3-ureidopropyltrimethoxysilane and mixtures thereof.

Representative an non-limiting examples of silane contain a functional group of Formula (XI) include N-(3-triethoxypropyl)-O-methylcarbamate, N-(3-triethoxysilylpropyl)-O-ethylcarbamate, 3-ureidopropyltriethoxysilane, 3-ureidopropyltrimethoxysilane, isocyanatomethyltriethoxysilane, isocyanatomethylmethyldiethoxysilane, 3-isocyanatopropyltrimethoxysi lane, 3-isocyanatopropyltriethoxysilane, chloromethyltriethoxysilane, 3-chloropropyltriethoxysilane, 3-bromopropyltriethoxysilane, 3-glycidoxypropyltriethoxysilane, 3-glycidoxypropyltrimethoxysilane, 3-glycidoxypropylmethyldiethoxysilane, 3-glycidoxypropylmethyldimethoxysilane and the like.

The reaction can be catalyzed. Typical catalysts are Brønsted-Lowry acids, as for example, sulfur acid, phosphoric acid, p-toluene sulfonic acid and hydrochloric acid, acid catalysts supported on solid polymeric resin, such solid sulfonated polystyrene and solid phosphonated polystyrene resin, or Lewis acids, as for example, dibutyltin oxide, dibutyl tin dilaurate, tetra alkyl titanates, zirconium or titanium complexes, and the like. The catalyst can optionally be removed from the hydrolyzable alkoxymethylamino-functional silane (d) by filtration of the acid catalysts supported on the solid polymeric resin, neutralization of Brønsted-Lowry acids with bases, absorption of the acid catalyst on an absorbent and followed by filtration of the reaction mixture or removal of the acid catalyst using an ion exchange resin, followed by filtration. The reaction can be carried out in the presence or absence of a solvent, such as hydrocarbon solvents, ether solvents, chlorinated solvents and the like.

The reactions can be carried out at sub-atmospheric, atmospheric or super-atmospheric pressure ranging from 0.01 kilogram-force/centimeter$^2$ to 5 kilogram-force/centimeter$^2$, more preferably from 1 kilogram-force/centimeter$^2$ to 1 kilogram-force/centimeter$^2$ and temperatures, and temperatures ranging from about 15° C. to 150° C., more preferably, from 30° C. to 100° C.

In another embodiment of the invention, the hydrolyzable alkoxymethylamino-functional silane (d) is prepared by the process comprising (i) contacting an amino resin having the structure of general Formula (VII), (VIII) or (IX), where R$^{12}$ is —CH$_2$OR$^{10}$, with a silane containing a functional group having the general Formula (X), (ii) reacting an amino resin with the silane containing a functional group of step (i) and optionally (iii) removing the alcohol, R$^{10}$OH. The reaction can be carried out in a reactor in the absence of the rubbery polymer (a) or in situ in a rubber composition comprising a rubber polymer (a) and optionally a reinforcing filler (b), where the silane containing a functional group has formed silanols and said silanols have reacted with reinforcing filler (b) to form covalent chemical bonds with the filler.

Preferably the silane containing a functional group can be a mercapto-functionalized silane, an ureido-functionalized silane, an amino-functionalized silane, a carbamato-functionalized silane, an epoxy-functionalized silane, an isocyanato-functionalized silanes or a blocked isocyanato-functionalized silane.

The mercaptofunctionalized silane used to prepare the hydrolyzable alkoxymethylamino-functional has the general Formula (VI):

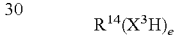

wherein
each R$^2$ is independently hydrogen, an alkyl group having from 1 to 10 carbon atoms and optionally at least one oxygen atom, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, preferably an alkyl group having from 1 to 3 carbon atoms and more preferably ethyl;
each R$^3$ is independently an alkyl group having from 1 to 3 carbon atoms or phenyl;
R$^4$ is an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms, preferably an alkylene group having from 1 to 6 carbon atoms, and more preferably, a propylene, and
a is an integer equal to 0, 1 or 2.

Active Hydrogen-Containing Compound (e)

The active hydrogen-containing compounds (e) are organic compounds containing at least two functional groups having a hydrogen atom bonded to a heteroatom of oxygen or nitrogen. The functional groups of the active hydrogen-containing compounds (e) includes hydroxyl, amido, ureido and amino. The active hydrogen-containing compound (e) can be used in the amounts of 0.1 to 30 parts active hydrogen-containing compounds (e) per 100 parts of rubbery polymer (a), more specifically from 0.2 to 15 parts active hydrogen-containing compounds (e) per 100 parts of rubbery polymer (a) and even more specifically from 0.3 to 10 parts active hydrogen-containing compounds (e) per 100 parts of rubbery polymer (a)

In one embodiment of the invention, the active hydrogen-containing compound (e) has the general Formula (XII):

wherein R$^{14}$ is a polyvalent organic group having from 1 to 100 carbon atom, preferably a polyvalent hydrocarbon group containing 1 to 50 carbon atoms or a polyvalent hydrocarbon containing 1 to 100 carbon atoms, more preferably 1 to 50 carbon atoms, and containing at least one heteroatom of oxygen or nitrogen; X$^3$ is —NH—, —NR$^{15}$—, —C(O)NH—, —C(═O)NR$^{15}$—, —NHC(═O)NH—, —NH(═O)NR$^{15}$—, —S—, —C(═O)O— or —O—, preferably —NH—, —NR$^{15}$— or —O—, wherein R$^{15}$ is independently an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms, an aralkyl group having from 7 to 12 carbon atoms or hydrogen, more preferably an alkyl group having from 1 to 3 carbon atoms or hydrogen and even more preferably hydrogen, methyl or ethyl; and e is an integer of from 2 to 15, more preferably 2 to 10 and even more preferably 2, 3, 4 or 5. X$^3$—H is an active hydrogen functional group, including amino functional groups, amido functional groups, carbamato functional groups, ureido functional groups, hydroxyl functional groups or mercapto functional groups.

Representative and non-limiting examples of the active hydrogen-containing compound (e) include aliphatic diols, triols or polyols, such as ethylene glycol, propylene glycol, 1,3-butanediol, diethylene glycol, triethylene glycol, polyethylene glycol having a molecular weight of up to about 2000 grams/mole, preferably from about 190 to about 2000 grams/mole, dipropylene glycol, tripropylene glycol polypropylene glycol having a molecular weight of from about 250 to about 2500 grams/mole, glycerol, trimethylolmethane, trimethylolethane, trimethylolpropane, pentaerythritol, glycerol monostearate and sorbitan monostearate; aromatic diols, triol or polyols, such as catechol, resorcinol, phloroglucinol, hydroquinone, phenol-formaldehyde resins, which include novolac resins in which formaldehyde to phenol molar ratio of less than one and resole resins in which the formaldehyde to phenol molar ratio is greater than or equal to one, penacolite resins, terephthaldehyde adducts, 2,2-bis (4-hydroxyphenyl)butane, 2,2-bis(4-hydroxyphenyl)propane, 1,1-bis(4-hydroxyphenyl)ethane, bis(4-hydroxyphenyl)methane and resorcinol-formaldehyde resins; polyamines, such as ethylene diamine, diethylene triamine, triethylene tetraamine, bis-(2-aminoethyl)ether and 2-aminoethyl heptanamide; and urea formaldehyde resins, preferably as catechol, resorcinol, hydroquinone, 2,2-bis(4-hydroxyphenyl)butane, novolac resins, resole resins and resorcinol-formaldehyde resins.

The active hydrogen-containing compound (e) can be commercially purchased, as for example, GP® 161G66, GP® 4864 triazone, GP® 445D05, GP® 48634, GP® 5018, GP® 5236 and GP® 7648 available from Georgia-Pacific Chemicals, penacolite resins P-19-s, B-20-s and r-2170 available from OXY INDSPEC Chemical Corporation, and Cellobond™ Resin J6030L and Cellobond™ J60021X01 available from Hexion.

Sulfur-Donating Compound (f)

The sulfur-donating compound (f) can be used to crosslink the rubbery polymer to form a crosslinked primary network. Without wishing to be bound by theory, the sulfur-donating compound (f) is believed to donate sulfur atoms under curing conditions. The sulfur-donating compound (f) generally has more than two sulfur atoms bonded together to form a chain of sulfur atoms. Polysulfides and elemental sulfur are sulfur-donating compounds (f), preferably sulfur, $S_8$.

Vulcanization can be conducted in the presence of sulfur-donating compound (f), often referred to as a vulcanizing agent. It reacts with the rubbery polymer (a) containing carbon-carbon double bonds to form a crosslinked, or cured, rubber. Some non-limiting examples of suitable sulfur vulcanizing agents include, e.g., elemental sulfur (free sulfur) or sulfur-donating compound such as the non-limiting examples of amino disulfide, polymeric polysulfide or sulfur-olefin adducts. These and other known and conventional vulcanizing agents are added in the usual amounts during a mixing step referred to as a productive mixing step in the process for preparing rubber compositions.

The sulfur-donating compounds are generally used at about 0.1 to about 5 phr, more preferably from about 1 to about 3 phr and even more preferably from about 1.5 to about 2.5 phr.

Other Ingredients in the Rubber Compositions

The rubber compositions can be compounded with other commonly used additive materials such as, e.g., retarders and accelerators, processing additives such as oils, resins such as tackifying resins, plasticizers, pigments, fatty acid, zinc oxide, waxes, antioxidants and antiozonants, peptizing agents, and the like. Depending on the intended use of the rubber compositions, these and/or other rubber additives are used in conventional amounts.

Vulcanization accelerators can also be used if desired. Non-limiting examples of vulcanization accelerators include benzothiazole, alkyl thiuram disulfide, guanidine derivatives and thiocarbamates. Other examples of such accelerators include, but are not limited to, mercapto benzothiazole, tetramethyl thiuram disulfide, tetrabenzyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methylpiperazine), dithiobis(N-beta-hydroxy ethyl piperazine) and dithiobis(dibenzyl amine). In another embodiment, other additional sulfur donors include, e.g., thiuram and morpholine derivatives. In a more specific embodiment, representative of such donors include, but are not limited to, dimorpholine disulfide, dimorpholine tetrasulfide, tetramethyl thiuram tetrasulfide, benzothiazyl-2,N-dithiomorpholide, thioplasts, dipentamethylenethiuram hexasulfide and disulfidecaprolactam.

Accelerators may be used to control the time and/or temperature required for vulcanization and to improve the properties of the vulcanizate. In one embodiment of the invention, a single accelerator system can be used, i.e., a primary accelerator. In another embodiment, conventionally and preferably, a primary accelerator(s) is used in total amounts ranging from about 0.5 to about 4 phr, and preferably from about 0.8 to about 2.0 phr. In a preferred embodiment, combinations of a primary and a secondary accelerator can be used with the secondary accelerator being used in smaller amounts, e.g., from about 0.05 to about 3 phr in order to activate and to improve the properties of the vulcanizate. In yet another embodiment, delayed action accelerators can also be used. In still another embodiment, vulcanization retarders can also be used. Suitable types of accelerators are those such as the non-limiting examples of amines, disulfides, guanidines, thioureas, thiazoles, thiurams, sulfenamides, dithiocarbamates, xanthates and combinations thereof. In a preferred embodiment, the primary accelerator is a sulfenamide. In another embodiment, if a second accelerator is used, the secondary accelerator can be a guanidine, dithiocarbamate or thiuram compound, such as for example tetrabenzyl thiuram disulfide used at levels from about 0.1 to about 0.3 phr, more preferably about 0.2 phr.

Optional tackifier resins can be used at levels of from about 0.5 to about 10 phr and preferably from about 1 to about 5 phr. In a preferred embodiment, the amounts of processing aids range from about 1 to about 50 phr. Suitable processing aids can include, as non-limiting examples, aromatic, naphthenic and/or paraffinic processing oils and combinations thereof. In yet another embodiment, preferred amounts of antioxidants are from about 1 to about 5 phr. Representative antioxidants include, as non-limiting examples, diphenyl-p-phenylenediamine and others, e.g., those disclosed in the Vanderbilt Rubber Handbook (1978), pages 344-346, which is incorporated by reference herein. In yet another embodiment, preferred amounts of antiozonants range from about 1 to about 5 phr. Preferred amounts of optional fatty acids, which can include the non-limiting example of stearic acid, range from about 0.5 to about 3 phr. Preferred amounts of zinc oxide range from about 2 to about 5 phr. Preferred amounts of waxes, e.g., microcrystalline wax, range from about 1 to about 5 phr. Preferred amounts of peptizers range from about 0.1 to about 1 phr. Suitable peptizers include, as non-limiting examples, pentachlorothiophenol, dibenzamidodiphenyl disulfide and combinations thereof.

In one embodiment of the invention, the uncured rubber compositions contain the hydrolyzable alkoxymethylaminofunctional silane (d), and the rubber composition preferably comprises (a) at least one rubbery polymer used to form a primary network, (b) at least one reinforcing filler that is capable of reacting with the hydrolyzable alkoxymethyl-amino-functional silane (d); (c) at least one secondary polymer network forming organic resin; (d) at least one hydrolyzable alkoxymethylamino-functional silane that can be reacted with the reinforcing filler (b), and optionally, (e)

at least one active hydrogen containing organic compound or (e) at least one active hydrogen containing organic compound and (f) at least one sulfur-donating compound, especially sulfur ($S_8$) or at least one sulfur-donating compound, especially sulfur ($S_8$). The rubbery polymer component (a) comprises one or more rubber components in which the rubber components add up to about 100 phr (parts per hundred rubber). In one embodiment of the invention, natural rubber should be about 50 to 100 phr of the primary polymer blend portion of the rubber composition, preferably about 75 to 100 phr. The reinforcing filler (b) can comprise about 1 to about 150 phr of the rubber composition, preferably from about 15 to 90 phr, more preferably from about 20 to 55 phr. In one embodiment of the invention, the reinforcing filler (b) is silica, preferably precipitated silica. The hydrolyzable alkoxymethylamino-functional silane (d) itself and/or the materials for forming the secondary network (network forming organic resins and active hydrogen-containing compounds) can comprise from about 6 to 50% of reinforcing filler weight portion of the formulation, preferably from about 8 to 25% of the reinforcing filler weight, more preferably about 12 to 25% of the reinforcing filler (b) weight in the formulation.

In one embodiment of the rubber composition of the invention, the rubbery polymer (a) contains natural rubber; the reinforcing filler (b) is precipitated silica; the organic resin (c) is an amino resin having the structure of Formula (VII):

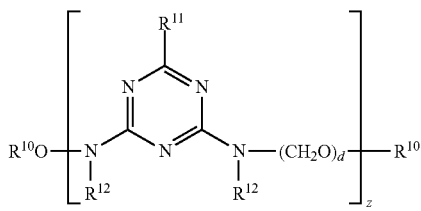

wherein $R^{10}$ is hydrogen, methyl, ethyl or propyl, $R^{12}$ is methoxymethyl, ethoxymethyl or propoxymethyl, $R^{11}$ is N,N-bis-(methoxymethyl)-aminomethyl, N,N-bis-(ethoxymethyl)-aminomethyl or N,N-bis-(propoxymethyl)-aminomethyl, and z is 1 to 40; the active hydrogen-containing compound (d) is catechol, resorcinol, hydroquinone, phenol-formaldehyde resins, 2,2-bis(4-hydroxyphenyl)butane, 2,2-bis(4-hydroxyphenyl)propane, 1,1-bis(4-hydroxyphenyl)ethane, bis(4-hydroxyphenyl)methane or resorcinol-formaldehyde resins; the hydrolyzable alkoxymethylamino-functional silane (d) has the structure of Formula (III):

—$NR^1CH_2$— group, where the methylene carbon atom of the group is bonded to the nitrogen atom; a is 2 or 3, x is 1, 2, 3, 4 or 5, and y is 0 or 1; the active hydrogen-containing compound (e) is catechol, resorcinol, hydroquinone, phenol-formaldehyde resins, 2,2-bis(4-hydroxyphenyl)butane, 2,2-bis(4-hydroxyphenyl)propane, 1,1-bis(4-hydroxyphenyl)ethane, bis(4-hydroxyphenyl)methane or resorcinol-formaldehyde resins; and the sulfur-donating compound (f) is sulfur.

In one embodiment, the rubber composition comprises:
(a) a rubbery polymer or blend of polymers;
(b) at least one reinforcing filler that is reactive with the hydrolyzable alkoxymethylamino-functional silane;
(c) at least one organic resin;
(d) at least one hydrolyzable alkoxymethylamino-functional silane;
(e) optionally, at least one active hydrogen containing organic compound; and
(f) optionally, at least one a sulfur-donating compound.

In another embodiment, the rubber composition comprises alkoxymethylamino-functional silane (d) in an amount of from about 0.2 to about 20 weight percent based on the total weight of rubber composition, the rubbery component (a) in an amount of from about 25 to about 95 weight percent based on the total weight of the rubber composition, the reinforcing filler (b) that is reactive with the alkoxymethylamino-functional silane (d) in an amount of from about 2 to about 70 weight percent based on the total weight of rubber composition, the organic resin (c) in the amount of from about 0.2 to about 25 weight percent based on the total weight of the rubber composition, the active hydrogen-containing compound (e) in the amount of from about 0.2 to about 25 weight percent based on the total weight of the rubber composition and the amount of the sulfur-donating compound (f) in an amount of from about 0.2 to about 5 weight percent based on the total weight of the rubber composition.

In still another embodiment, the rubber composition comprising a combination of:
(i) a primary polymeric network comprising (a) a rubbery polymer or blend of polymers and (b) at least one sulfur-donating compound; and
(ii) a secondary polymeric network comprising the reaction product of (b) at least one reinforcing filler, (c) at least one organic resin, (d) at least one hydrolyzable alkoxymethylamino-functional silane (e) at least one active hydrogen containing organic compound.

In the primary polymeric network, the rubbery polymer (a) is selected from the group consisting of natural rubber (NR), synthetic polyisoprene (IR), polybutadiene (BR), various copolymers of butadiene, the copolymers of isoprene, solution styrene-butadiene rubber (SSBR), emulsion styrene-butadiene rubber (ESBR), ethylene-propylene terpolymers (EPDM), acrylonitrile-butadiene rubber (NBR), and functionalized rubbers that are modified by at least one

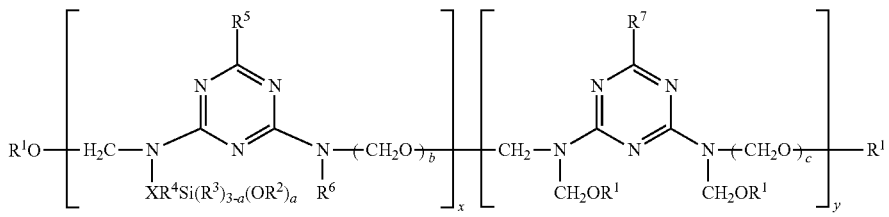

wherein $R^1$ is methyl, ethyl or propyl; $R^2$ is methyl, ethyl or propyl; $R^3$ is methyl; $R^4$ is propylene; each $R^5$ and $R^7$ is N,N-bis-(methoxymethyl)-aminomethyl, N,N-bis-(ethoxymethyl)-aminomethyl or N,N-bis-(propoxymethyl)-aminomethyl, each X is independently —$SCH_2$— or alkoxysilyl group, tin-containing group, amino group, hydroxyl group, carboxylic acid group, polysiloxane group, epoxy group or phthalocyanimo group. In particular, the rubber polymer (a) comprises natural rubber or a mixture of natural rubber and butadiene rubber.

In the primary polymeric network, the at least one sulfur donating compound (f) is particularly sulfur.

In the secondary polymeric network, the reinforcing filler (b) before reaction with the reacting with the alkoxymethylamino-functional silane (d) can be fibers, particulates or sheet-like structures comprising metalloid oxides or metal oxides having surface hydroxyl groups that are capable of reacting the with the alkoxymethylamino-functional silane (d). In particular, the reinforcing filler (b) before reaction with the with the alkoxymethylamino-functional silane (d) can be silicates, clays, ceramics, diatomaceous earth, pyrogenic silica, precipitated silica, titanium dioxide, aluminosilicate, alumina, talc and mixtures thereof, and more particularly, precipitated silica.

In the secondary polymeric network, before the organic polymer (c) has reacted with the other reactants used in the formation of the secondary polymeric network, the organic polymer (c) can be polyisocyanates, polyisocyanurates, epoxy resins, amino resins and polyurethanes.

In one embodiment, the organic polymer (c) before it has reacted with the other reactants used in the formation of the secondary polymeric network can be an amino resin having the chemical structure of Formulae (VII) or (VIII):

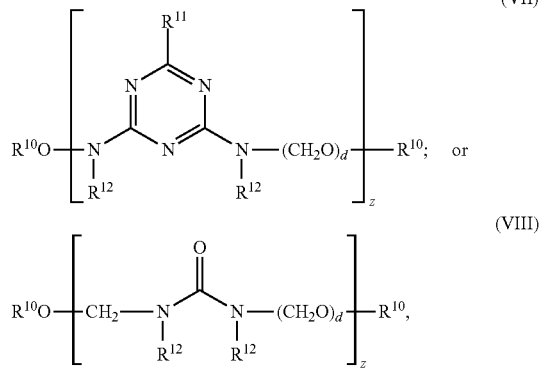

wherein
each $R^{10}$ is independently an alkyl group having from 1 to 10 carbon atoms, a cycloalkyl group having from 3 to 10 carbon atoms, alkenyl group having from 2 to 10 carbon atoms, an aryl group having from 6 to 12 carbon atoms, an aralkyl group having from 7 to 12 carbon atoms or hydrogen;
each $R^{11}$ is independently phenyl, —N(CH$_2$OR$^{10}$)$_2$ or —NH(CH$_2$OR$^{10}$);
each $R^{12}$ is independently hydrogen or —CH$_2$OR$^{10}$; and
each d and z is an integer, where d is 0 or 1 and z is 1 to 40.

Representative and non-limiting examples of the amino resin before reaction with the other reactants used in the formation of the secondary polymeric network include 1,1,3,3-tetra-methoxymethylurea, 1,3,3-tris-methoxymethylurea, 1,3-bis-methoxymethylurea, 1,1-bis-methoxymethylurea, 1,1,3,3-tetra-ethoxymethylurea, 1,3,3-tris-ethoxymethylurea, 1,3-bis-ethoxymethylurea, 1,1-bis-ethoxymethylurea, 1,1,3,3-tetra-propoxymethylurea, 1,3-tris-propoxymethylurea, 1,3-bis-propoxymethylurea, 1,1-bis-propoxymethylurea, 1,1,3,3-tetra-butoxymethylurea, 1,1,3,3-tetra-phenoxymethylurea, N-(1,3,3-tris-ethoxymethylureidomethyl)-1,1,3,3-tetra-ethoxymethylurea, N,N'-bis-(1,1,3-tris-ethoxymethylureidomethyl)-1,3-bis-ethoxymethylurea, N,N'-bis-(1,1,3-tris-ethoxymethylureido-methoxymethyl)-1,3-bis-ethoxymethylurea, N,N,N',N',N'',N''-hexakis-methoxymethyl-[1,3,5]triazine-2,4,6-triamine, N,N,N',N',N'',N''-pentakis-methoxymethyl-[1,3,5]triazine-2,4,6-triamine, N,N,N',N''-tetrakis-methoxymethyl-[1,3,5]triazine-2,4,6-triamine, N,N,N',N',N'',N''-hexakis-ethoxymethyl-[1,3,5]triazine-2,4,6-triamine, N,N,N',N',N''-pentakis-ethoxymethyl-[1,3,5]triazine-2,4,6-triamine, N,N,N',N''-tetrakis-ethoxymethyl-[1,3,5]triazine-2,4,6-triamine, N,N,N',N',N'',N''-hexakis-propoxymethyl-[1,3,5]triazine-2,4,6-triamine, N,N,N',N',N''-pentakis-propoxymethyl-[1,3,5]triazine-2,4,6-triamine, N,N,N',N''-tetrakis-propoxymethyl-[1,3,5]triazine-2,4,6-triamine, N,N,N',N',N'',N''-hexakis-phenoxymethyl-[1,3,5]triazine-2,4,6-triamine, N,N,N',N',N''-pentakis-phenoxymethyl-[1,3,5]triazine-2,4,6-triamine and N,N,N',N''-tetrakis-phenoxymethyl-[1,3,5]triazine-2,4,6-triamine.

In the secondary polymeric network, the active hydrogen-containing organic compound (e) before reaction with the other reactants used in the formation of the secondary polymeric network has the structure of Formula (XII):

wherein $R^{14}$ is a polyvalent organic group having from 1 to 100 carbon atoms or a polyvalent hydrocarbon containing 1 to 100 carbon atoms containing at least one heteroatom of oxygen or nitrogen; $X^3$ is —NH—, —NR$^{15}$—, —C(O)NH—, —C(=O)NR$^{15}$—, —NHC(=O)NH—, —NH(=O)NR$^{15}$—, —S—, —C(=O)O— or —O—, where $R^{15}$ is independently an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms, an aralkyl group having from 7 to 12 carbon atoms or hydrogen.

In one embodiment, $R^{14}$ contains at least one ether functional group, amino functional group, ester functional group, ketone functional group, aldehyde functional groups, amido functional groups, carbamato functional group or ureido functional group.

Representative and non-limiting examples of the active hydrogen-containing organic compound (d) before reaction with the other reactants used in the formation of the secondary polymeric network include ethylene glycol, propylene glycol, 1,3-butanediol, diethylene glycol, triethylene glycol, polyethylene glycol having a molecular weight of from 194 to about 2000 grams/mole, dipropylene glycol, tripropylene glycol polypropylene glycol having a molecular weight of from 250 to 2500 grams/mole, glycerol, trimethylolmethane, trimethylolethane, trimethylolpropane and pentaerythritol, catechol, resorcinol, hydroquinone, phenol-formaldehyde resins, 2,2-bis(4-hydroxyphenyl)butane, 2,2-bis(4-hydroxyphenyl)propane, 1,1-bis(4-hydroxyphenyl)ethane, bis(4-hydroxyphenyl)methane, resorcinol-formaldehyde resins, ethylene diamine, diethylene triamine, triethylene tetraamine, bis-(2-aminoethyl)ether, 2-aminoethyl heptanamide, glycerol monostearate, sorbitan monostearate and urea formaldehyde resins.

In one specific embodiment, the secondary polymeric network is formed from the reaction of precipitated silica, amino resin having the structure of Formula (VII):

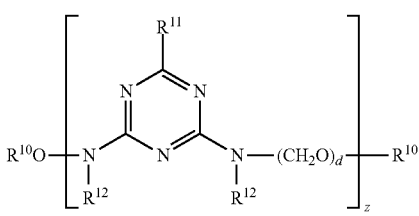

wherein $R^{10}$ is methyl, ethyl or propyl, $R^{12}$ is methoxymethyl, ethoxymethyl or propoxymethyl. $R^{11}$ is N,N-bis-(methoxymethyl)-aminomethyl, N,N-bis-(ethoxymethyl)-aminomethyl or N,N-bis-(propoxymethyl)-aminomethyl, the active hydrogen-containing compound (e) which is catechol, resorcinol, hydroquinone, phenol-formaldehyde resins, 2,2-bis(4-hydroxyphenyl)butane, 2,2-bis(4-hydroxyphenyl)propane, 1,1-bis(4-hydroxyphenyl)ethane, bis(4-hydroxyphenyl)methane or resorcinol-formaldehyde resins and the hydrolyzable alkoxymethylamino-functional silane (d) has the structure of Formula (III):

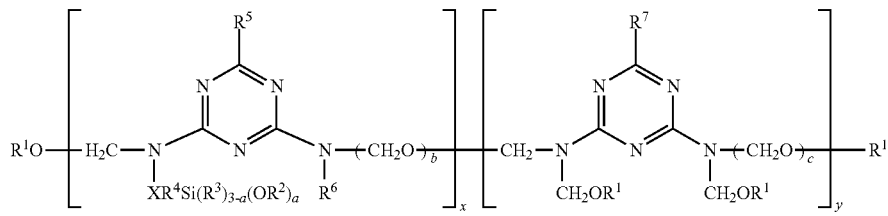

wherein $R^1$ is methyl, ethyl or propyl; $R^2$ is methyl, ethoxy or propyl, $R^3$ is methyl, $R^4$ is propylene; each $R^5$ and $R^7$ is N,N-bis-(methoxymethyl)-aminomethyl, N,N-bis-(ethoxymethyl)-aminomethyl or N,N-bis-(propoxymethyl)-aminomethyl, X is —$SCH_2$—; a is 2 or 3, x is 1, 2, 3, 4 or 5, and y is 0 or 1.

In one embodiment, the amounts of components (b), (c), (d) and (e) before reaction to form the secondary polymeric network are alkoxymethylamino-functional silane (d) in the amount of from about 0.2 to about 20 weight percent based on the total weight of rubber composition, the reinforcing filler (b) that is reactive with the alkoxymethylamino-functional silane (d) in the amount of from about 2 to about 70 weight percent based on the total weight of rubber composition, the organic resin (c) in the amount of from about 0.2 to about 25 weight percent based on the total weight of the rubber composition and the active hydrogen-containing compound (e) in the amount of from about 0.2 to about 25 weight percent based on the total weight of the rubber composition.

In the cured rubber composition, the primary polymeric network is cured to form a crosslinked rubber polymer or crosslinked blend of polymers by subjecting the rubber composition to an elevated temperature for a time sufficient to react the rubber polymer or blend or rubber polymers (a) with the at least one sulfur-donating compound (f).

Process for Providing for a Rubber Composition

In another embodiment of the invention, the process for providing the rubber compositions described herein involves the mixing of components (a), (b), (c), (d), (e) and (f), as disclosed above, in effective amounts. In one embodiment of a process in accordance with the invention, an effective amount of alkoxymethylamino-functional silane (d) can range from about 0.2 to about 20, preferably from about 0.5 to about 15 and more preferably from about 2 to about 10, weight percent based on the total weight of rubber composition. An effective amount of rubbery component (a) can range from about 25 to about 95, preferably from about 50 to about 90 and more preferably from about 60 to about 80, weight percent based on the total weight of the rubber composition. An effective amount of the reinforcing filler that is reactive with the alkoxymethylamino-functional silane (d) can range from about 2 to about 70, preferably from about 5 to about 55 and more preferably from about 20 to about 50, weight percent based on the total weight of rubber composition. An effective amount of organic resin (c) can range from about 0.2 to about 25 weight percent, preferably from about 2 to about 15 weight percent and more preferably from about 5 to about 10, weight percent based on the total weight of the rubber composition. An effective amount of the active hydrogen-containing compound (e) can range from about 0.2 to about 25 weight percent, preferably from about 2 to about 15 weight percent and more preferably from about 5 to about 10, weight percent based on the total weight of the rubber composition. An effective amount of the sulfur-donating compound (f) can range from about 0.2 to about 5, preferably from about 0.5 to about 2.5 and more preferably from about 1 to about 2, weight percent based on the total weight of the rubber composition.

In another embodiment of the invention, the process for preparing a rubber composition can optionally comprise curing the rubber composition, before, during and/or after molding the rubber composition. A vulcanized rubber composition should contain a sufficient amount of the secondary polymer network to contribute to a higher modulus and better wear. The combined weight of the reinforcing filler that is reactive with the alkoxymethylamino-functional silane (d) can be as low as 5 and can range preferably from about 10 to about 150 parts per hundred parts of rubbery polymer (a) (phr) and more preferably ranged from about 25 to about 85 phr, and even more preferably from about 50 to about 70 phr.

In one embodiment of the invention, the hydrolyzable alkoxymethylamino-functional silane (d) can be premixed, or pre-reacted, with particles, aggregates and/or agglomerates of the reinforcing filler (b) or added to the rubber mix during the processing or mixing of the rubbery polymer (a) and reinforcing filler (b). In another embodiment, the alkoxymethylamino-functional silane (d) and reinforcing filler (b) are added separately to the process mixture containing rubbery polymer (a) component. Reinforcing filler (b) and hydrolyzable alkoxymethylamino-functional silane (d) can be considered to couple or react in situ to form a reinforcing filler in which the alkoxymethylamino-functional silane (d) is chemically bonded to the filler.

In one embodiment of the invention, the process for preparing the rubber compositions comprise multiple steps. In the non-productive step (i), components (a), (b) and (d) are mixed under reactive-mechanical-working conditions.

As used herein, the expression "reactive-mechanical-working conditions" shall be understood to mean the conditions of elevated temperature, residence time and shear prevailing within a mechanical-working apparatus, such as an extruder, intermeshing mixer, or tangential mixer, such conditions being sufficient to bring about one or more of the following:
 a) the reactive process of hydrolysis of alkoxymethylamino-functional silane (d) with water, which is present on the reinforcing filler (b), to form alkoxymethylamino-functional silanols;
 b) the reactive process of these silanols with reinforcing filler (b) to form covalent chemical bonds with the filler;
 c) the breakdown of reinforcing filler (b) agglomerates into smaller aggregates and/or individual filler particles; and,
 d) the dispersion into the rubbery polymer (a) the reinforcing filler (b) covalently bonded to hydrolyzed and subsequently condensed alkoxymethylamino-functional silane.

In the non-productive step (ii), the organic resin (c) and/or the active hydrogen-containing components (e) are added to the mixture of step (i). In the non-productive step (ii), components (a), (b), (c), (d) and (e) are mixed under reactive-mechanical-working conditions, where the conditions of elevated temperature, residence time and shear prevailing within a mechanical-working apparatus, such as an extruder, intermeshing mixer, or tangential mixer, such conditions being sufficient to bring about one or more of the following:
 e) the dispersion into the mixture of the rubbery polymer (a), reinforcing filler (b) covalently bonded to hydrolyzed and subsequently condensed alkoxymethylamino-functional silane of step (i) the organic resin (c) and active hydrogen-containing compound (e);
 f) reaction of the reinforcing filler (b) covalently bonded to hydrolyzed and subsequently condensed alkoxymethylamino-functional silane with the organic resin (c) or the active hydrogen-containing compound (e) or the organic resin (c) and the active hydrogen-containing compound (e); and optionally
 g) reaction of the organic resin (c) with the active hydrogen-containing compound (e) if present to form the secondary network dispersed within the primary network and provide for uncured rubber composition.

If either the organic resin (c) or the active hydrogen-containing components (d) are not added in step (ii), then the missing ingredient can be added in a second non-productive mixing step (ii).

In the productive step (iii), the sulfur-donating compound (f) is added to the mixture of step (ii).

In any of steps (i), (ii) or (iii), other components can be added to the rubber composition. Representative and non-limiting examples of other components include activators, processing aids, accelerators, waxes, oils, anti-ozonants and anti-oxidants, The rubber composition is typically mixed in a mixing apparatus under high shear conditions where it autogenously heats up as a result of the mixing, primarily due to shear and associated friction occurring within the rubber mixture.

In a preferred embodiment of the invention, the mixture of the desired amounts of rubbery polymer (a), reinforcing filler (b) and hydrolyzable alkoxymethylamino-functional silane (d) of step (i) is substantially homogeneously blended under reactive-mechanical-working conditions in mixing step (i) carried out on a continuous or non-continuous basis. Non-continuous mixing can be employed where a build-up of excessive heat might occur and the rubber composition may need to be cooled. Cooling of the rubber will avoid or minimize thermal decomposition of rubbery polymer component(s) or other components in the rubber composition. Preferably, mixing step (i) is conducted at temperatures from 100° C. to 200° C. and more preferably from 140° C. to 180° C.

In step (iii), at least one sulfur-donating compound (f) along with other vulcanization accelerators, can be mixed with the rubber composition from step (ii). Mixing should be accomplished under non-reactive-mechanical-working conditions. As used herein, the expression "non-reactive-mechanical-working" conditions shall be understood to mean the conditions of sub-ambient, ambient or slightly elevated temperature, residence time and shear prevailing within a mechanical-working apparatus, such as an extruder, intermeshing mixer, tangential mixer, or roll mill, such conditions being sufficient to bring about dispersion of the sulfur-donating compound (f), e.g. vulcanizing agent, and vulcanization accelerators into the rubber composition of step (ii) without resulting in any appreciable vulcanization of the rubber composition. Low temperatures and low shear are advantageously employed in step (iii).

In step (iii), residence time can vary considerably and is generally chosen to complete the dispersion of the vulcanizing agent. Residence times in most cases can range from 0.5 to 30 minutes and preferably from 5 to 20 minutes.

The temperature employed in step (iii) can range from 5° C. to 150° C., preferably from 30° C. to 120° C. and more preferably from 50° C. to 110° C. These temperatures are lower than those utilized for reactive-mechanical-working conditions in order to prevent or inhibit premature curing of the sulfur-curable rubber, sometimes referred to as scorching of the rubber composition, which might take place at higher temperatures.

The rubber composition may be allowed to cool, e.g., during or after step (iii) or between step (i) and step (ii) or between step (ii) and step (iii), to a temperature of 50° C. or less.

In another embodiment of the invention, when it is desired to mold and to cure the rubber composition, the rubber composition is placed in the desired mold and heated to at least about 130° C. and up to about 200° C. for a time of from 1 to 60 minutes to bring about the vulcanization of the rubber.

Rubber compositions preferred for forming tire tread portions in accordance with preferred embodiments of the invention comprise (a) a rubbery primary polymer or blend of polymers, (b) reinforcing silica filler particles, (c) an organic resin capable of forming a secondary polymer network, which can be generated in-situ, (d) a hydrolyzable alkoxymethylamino-functional silane which can react with the reinforcing filler (b) and/or an active hydrogen-containing compound (e) in which components (b), (c), (d) and (e) contribute to the aforementioned secondary network.

The rubber composition herein can be used for various purposes. In one embodiment of the invention, there is provided an article of which at least one component is the herein described cured rubber composition. In another embodiment herein, there is provided a tire at least one component of which, e.g., the tread, is the herein described cured rubber composition. In yet another preferred embodiment, for example, the rubber composition can be used for the manufacture of such articles as shoe soles, hoses, seals, cable jackets, gaskets and other industrial goods. Such articles can be built, shaped, molded and cured by various known and conventional methods as is readily apparent to those skilled in the art. In particular, the compositions and methods in accordance with the invention are particularly well suited for the manufacture of tires, in particular, truck or bus tires.

EXAMPLES

Aspects and attributes of preferred embodiments of the invention will be described with reference to the following examples, which are being presented for purposes of illustration only and should not be construed as limiting.

Example 1—Preparation of Silane A

A process for the preparation of an alkoxymethylaminofunctional silane (d) in accordance with the invention, in which the mole ratio of silane containing a functional group to amino resin is about 1:1 is described below: Hexamethoxymethylmelamine (815 grams, available from Ineos as Resimene 3520) and 3-mercaptopropyltriethoxysilane (497.9 grams, available from Momentive Performance Materials under the tradename Silquest® A-1891 silane) were charged into a 2-liter round bottom flask equipped with a magnetic stirrer, a short-path distillation head, a heating mantle, and a temperature controller. The contents were heated to 40° C. until the components became miscible. Sulfuric acid (0.3 grams) was then added to the reaction flask. The contents were heated from 40° C. to 100° C. under 18 mmHg of initial vacuum. The vacuum was lowered to 9 mmHg while collecting methanol. A total of 103 grams of low boiling compounds and 1198.7 grams of Silane A product were recovered. The product was analyzed by GC, $^{13}$C NMR, LC/MS and GPC. The structure of Silane A was determined to include a mixture of structures, where the average structure was:

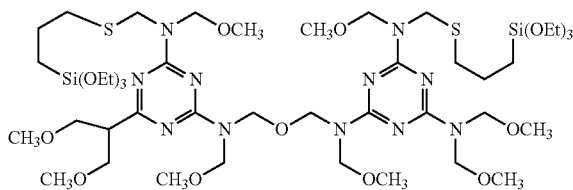

The components of the mixture included:

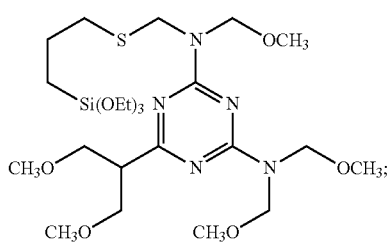

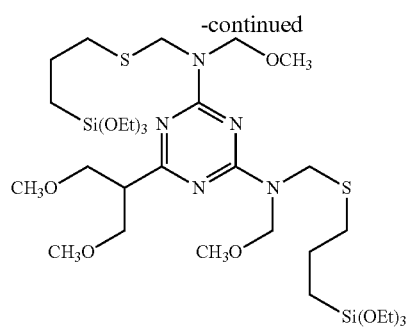

and stereoisomers of the two triethoxysilyl reaction products, and

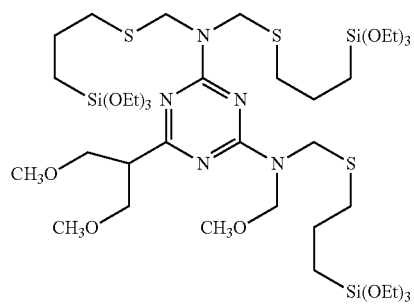

and stereoisomers of the three triethoxysilyl reaction products.

Example 2—Preparation of Silane B

Hexamethoxymethylmelamine (1017 grams, available from Ineos under the tradename Resimene 3520) and 3-mercaptopropyltriethoxysilane (310.7 grams, available from Momentive Performance Materials under the tradename Silquest® A-1891 silane) were charged into a 2-liter round bottom flask, equipped with a mechanical stirrer, a 6 inch vigreux column, a short-path distillation head, a heating mantle, and a temperature controller. The contents were heated to 40° C. until the components became miscible. Sulfuric acid (0.3 gram) was added to the reaction flask. The contents were heated from 40° C. to 100° C. under 18 mmHg of vacuum initially. The vacuum was lowered to 9 mmHg while collecting methanol. A total of 71 grams of low boiling compounds and 1231 grams of Silane B product were recovered.

Hexamethoxymethylmelamine is characterized by a central triazine ring having three alternating carbon and nitrogen atoms. The three carbon atoms are each bonded to an additional "free" nitrogen atom. Each "free" nitrogen is indirectly bonded to two oxygen atoms, thereby providing six silicon substitution sites for a silane, such as a silane coupling agent, to attach. When combined with silanes in accordance with the invention, this provides sites for the addition of six silane groups.

For example, Silane A, described above, includes one silane substituted per hexamethoxymethylmelamine molecule. Silane B, below includes one silane substitution for every two hexamethoxymethylmelamine molecules. Thus, Silane A can be considered to have 1 silane per hexamethoxymethylmelamine molecule and Silane B can be considered to have one-half of a silane per hexamethoxymethylmelamine molecule.

Examples 3 and 4 and Comparative Examples I and II—Rubber Compositions

Table 1 lists the ingredients used for preparing rubber compositions using an 80/20 blend of Natural Rubber/cis 1,4-polybutadiene. The compositions contain N121 carbon black (control) and silica coupled with TESPT (coupling agent) or Silane A, a silane in accordance with preferred embodiments of this invention comprising a silane modified network forming polymer. As used herein, "non-productive" combinations refer to combinations of materials that are not cured and "productive" combinations are used to result in cured compositions.

TABLE 1

| Ingredients | Comp. Ex. I Carbon black formulation | Comp. Ex II TESPT formulation | Example 3 Resorcinol formulation | Example 4 Penacolite formulation |
|---|---|---|---|---|
| 1st Non-Productive | | | | |
| Natural Rubber[1] | 80.0 | 80.0 | 80.0 | 80.0 |
| cis 1,4-Polybutadiene[2] | 20.0 | 20.0 | 20.0 | 20.0 |
| Silica[3] | 0.0 | 50.0 | 50.0 | 50.0 |
| Carbon Black[4] | 25.0 | 5.0 | 5.0 | 5.0 |
| TDAE Process Oil | 1.0 | 1.0 | 1.0 | 1.0 |
| TESPT | 0.0 | 4.0 | 0.0 | 0.0 |
| Sliane A | 0.0 | 0.0 | 6.0 | 6.0 |
| Zinc Oxide | 1.5 | 1.5 | 1.5 | 1.5 |
| Stearic Acid | 1.0 | 1.0 | 1.0 | 1.0 |
| Non-productive Mix 1 Total | 128.5 | 162.5 | 164.5 | 164.5 |
| 2nd Non-Productive | | | | |
| Carbon Black | 25.0 | 5.0 | 5.0 | 5.0 |
| 6-PPD[5] | 2.0 | 2.0 | 2.0 | 2.0 |
| TMQ[6] | 0.5 | 0.5 | 0.5 | 0.5 |
| Microcystalline Wax | 1.3 | 1.3 | 1.3 | 1.3 |
| Zinc Oxide | 1.5 | 1.5 | 1.5 | 1.5 |
| Stearic Acid | 1.0 | 1.0 | 1.0 | 1.0 |
| Hexa(methoxymethyl) melamine (HMMM) | 0.0 | 0.0 | 1.25 | 1.25 |
| Non-productive Mix 2 Total | 159.8 | 173.8 | 177.1 | 177.1 |
| 3rd Non-Productive | | | | |
| Resorcinol | 0.0 | 0.0 | 0.63 | 0.0 |
| Penacolite Resin B-19-SC | 0.0 | 0.0 | 0.0 | 1.1 |
| Non-productive Mix 3 Total | 159.8 | 173.8 | 177.7 | 178.2 |
| Productive Mix | | | | |
| Sulfur | 1.600 | 1.600 | 1.600 | 1.600 |
| CBS[7] | 1.100 | 2.000 | 2.000 | 2.000 |
| DPG[8] | 0.4 | 0.4 | 0.4 | 0.4 |
| Rubber Composition Total | 162.9 | 177.8 | 181.7 | 182.2 |

[1]Natural Rubber(cis 1, 4-polyisoprene) - as SIR 20- Standard Indonesian Rubber
[2]High cis 1,4-polybutdadiene rubber (SYNTECA 44)-Synthos S.A.
[3]Zeosil 1165MP- Solvay
[4]N121 Carbon black-Columbian Chemicals Company
[5]N-1,3-dimethylbutyl-N-phenyl-para-phenylenediamine-Harwick Standard Distribution Corporation
[6]2,2,4-Trimethyl-1,2-Dihydroquinoline polymer-NOCIL
[7]N-Cyclohexyl-2-benzothiazole sulfonamide (CBS)(accelerator)- Harwick Standard Distribution Corporation
[8]Diphenylguanidine- Harwick Standard Distribution Corporation The silica-containing formulations require slightly more CBS due to the tendency of silica to absorb this accelerator to its surface. All four formulations (carbon black control, TESPT, Silane A with Resorcinol, and Silane A with Penacolite, were mixed in an internal rubber mixer utilizing a mixing procedure involving three sequential non-productive mixing steps followed by a final productive (curative) mix. The silica formulation containing TESPT was heat treated for 150 secs at 145° C. during all 3 non-productive passes. The silica formulation containing Silane A was heat treated for 150 secs at 155° C. during the $1^{st}$ non-productive, for 150 secs at 150° C. for the $2^{nd}$ non-productive, and for 150 secs at 140° C. for the $3^{rd}$ non-productive step. The hexa(methoxymethyl) melamine and resorcinol for the in-situ polymerization of the secondary network for the Silane A formulation were added in the $2^{nd}$ and $3^{rd}$ non-productive stages, respectively. The phr loading for hexa(methoxymethyl)melamine and resorcinol are optimized values to ensure that the Shore A Hardness for the cured compounds are within the typical range for a truck tire formulation (Shore A Hardness of 60-65) and to achieve the best balance of physical and dynamic properties.

All four formulations were mixed with curatives in the final productive mix for 180 secs at 105° C. The rubber compositions shown in Table 1 were cured at 160° C. for 15 minutes. The resulting physical and dynamic properties are shown below in Table 2.

TABLE 2

| Sample | Comp. Ex. I | Comp. Ex. II | Example 3 | Example 4 |
|---|---|---|---|---|
| Mooney | | | | |
| Plasticity ML1 + 4 at 100° C. | 65.5 | 62.1 | 83.9 | 81.1 |
| Scorch Ts3 | 7.6 | 17.7 | 11.7 | 13.6 |
| Rheometer, 160° C. | | | | |
| Max. Torque, dNm | 20.75 | 21.14 | 19.85 | 19.77 |
| Min. Torque, dNm | 2.67 | 2.34 | 3.15 | 3.05 |
| Delta Torque, dNm | 18.10 | 18.80 | 16.70 | 16.70 |
| Stress-Strain | | | | |
| Tensile Strength, MPa | 22.4 | 22.2 | 23.1 | 22.4 |
| Elongation @ Break, % | 474 | 519 | 488 | 492 |
| 100% Modulus, MPa | 2.4 | 2.2 | 7.3 | 2.3 |
| 300% Modulus, MPa | 13.5 | 11.8 | 13.5 | 13.2 |
| Reinforcing Index | 5.6 | 5.5 | 5.8 | 5.7 |
| Shore A Hardness | | | | |
| 25° C. | 63.6 | 62.5 | 64.5 | 64.3 |
| 70° C. | 60.2 | 61.2 | 60.5 | 61.5 |
| Durability | | | | |
| Graves Tear (100° C.), N/mm | 59.7 | 59.3 | 57.8 | 61.4 |
| High Speed Tear Energy (HSTE) $MJ/m^3$ | 8.5 | 10.0 | 9.3 | 9.7 |
| Heat, Buildup, ° C. | 16.9 | 11.4 | 13.7 | 13.9 |
| Abrasion Resistance | | | | |
| DIN Abrasion loss, $mm^3$ | 59.7 | 79.3 | 57.8 | 61.4 |
| Angular Abrasion Loss (12° slip angle, high severity), g/Km | 0.619 | 0.917 | 0.620 | 0.636 |
| Angular Abrasion Loss (16° slip angle, ultrahigh severity), g/Km | 2.33 | 3.42 | 2.53 | 2.52 |
| Eplexor, cured compound | | | | |
| E' @ 10% strain, 55° C. (Strain Sweep), MPa | 4.83 | 4.48 | 4.81 | 4.76 |
| Tan δ @ 10% strain, 55° C. (Strain Sweep) | 0.138 | 0.104 | 0.119 | 0.129 |
| E' @ 60° C. (Temp. Sweep), MPa | 8.49 | 6.73 | 7.16 | 7.56 |
| Tan δ @ 60° C. (Temp. Sweep) | 0.116 | 0.080 | 0.085 | 0.095 |
| E' @ 30° C. (Temp. Sweep), MPa | 10.19 | 7.26 | 7.95 | 8.59 |
| E' @ 0° C. (Temp. Sweep), MPa | 13.24 | 9.21 | 10.40 | 11.76 |
| Tan δ @ 0° C. (Temp. Sweep) | 0.177 | 0.153 | 0.157 | 0.176 |

TABLE 2-continued

| Sample | Comp. Ex. I | Comp. Ex. II | Example 3 | Example 4 |
|---|---|---|---|---|
| RPA strain sweep, cured compound | | | | |
| G' @ 10% strain, 60° C. | 1.29 | 1.03 | 1.38 | 1.39 |
| Tan δ @ 10% strain, 60° C. | 0.282 | 0.232 | 0.231 | 0.246 |
| Rebound | | | | |
| 70° C. | 59.2 | 63.8 | 60.1 | 58.5 |
| 100° C. | 62.1 | 67.0 | 63.2 | 62.6 |

As shown in Table 2, the Shore A Hardness of all four formulations is similar. Thus, the physical and chemical properties can be compared on an equal hardness basis.

The scorch safety and cure behavior of Silane A is comparable to that of TESPT (See FIG. 1). The higher minimum torque observed in the Silane A compounds is likely due to the secondary polymer network initiation and growth. The Silane A compounds have lower values of delta torque (difference of modulus at 100% strain versus modulus at 300% strain) compared to TESPT, despite the in-situ creation of a thermosetting polymeric network in the Silane A compounds during the cure process. Although the TESPT compound has a higher number of total sulfur atoms ($4.79*10^{22}$ atoms compared to $3*10^{22}$ atoms) that could be a contributing factor, the lower delta torque observed in the Silane A compounds is possibly due to the hydrophobating effect of the excess hexa(methoxymethyl)melamine moieties from the Silane A and the free hexa(methoxymethyl) melamine on the silica. This likely results in less filler-filler interaction, and a lower max torque. The rubber compounds prepared with Silane A have greater stiffness, as indicated by 300% modulus, and reinforcing index than the rubber compounds prepared with TESPT and comparable stiffness to the rubber compounds formulated with the N121-carbon black control filler. It is believed that there is a greater polymer-filler interaction and less filler-filler interaction in the rubber compounds formulated with Silane A, as compared to the rubber compounds formulated with TESPT. This becomes evident when the lower delta torque values are also taken into consideration. The reinforcement enhancement is a positive indicator for improved wear and abrasion resistance.

All four formulations of Table 1 exhibit comparable tensile strengths. The tear resistance of the Silane A compounds is acceptable, as it is comparable to the carbon black control. The silica-containing compounds all have a greater High Speed Tear Energy (HSTE) than the carbon black control compounds, which is a strong indication of better cut and chip resistance, an important property in a truck or bus tire. Furthermore, using the Silane A formulation would improve retreadability, because the lower heat buildup exhibited with these compounds correlates with improved retreadability, another important property in truck tires.

Figure 2:
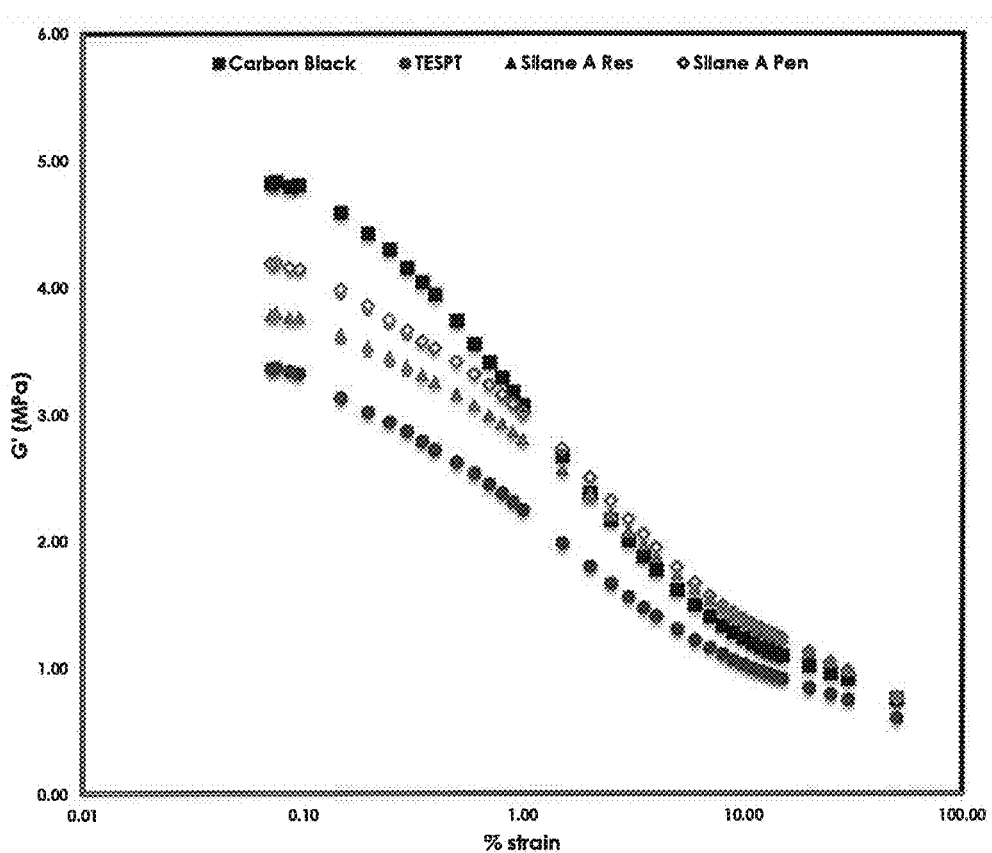
FIG. 2 is a graph of an RPA strain sweep on cured compound at 60° C. showing an increase in polymer-filler interaction.

The Silane A formulation exhibited excellent abrasion resistance in the silica-containing rubber compound, as measured using both a DIN abrader and an Angle Abrader (at both 12° and 16° slip angles under a normal load of 61N and 123N, respectively, using grindstone as the grinding surface). The Silane A compounds exhibited comparable abrasion resistance to the N121-carbon black control. Silane A also improved DIN abrasion resistance by 33% and angle abrasion resistance by 48% versus the TESPT compound. Two key contributing factors to the significant improvement in abrasion resistance include an increase in the effective filler volume and bound rubber content. The resulting increase in polymer-filler interaction is seen in FIG. 2, an RPA strain sweep on cured compound at 60° C. The crossing of Silane A storage modulus curves over the carbon black curve at 2-3% strain is indicative of a greater hydrodynamic effect, i.e., higher effective filler volume and bound rubber content. Referring to Table 2, the dynamic stiffness (G', E') between 30° C. and 60° C. is an indicator for tire handling. It can be compromised if silane-coupled silica replaces carbon black in a tire formulation. This trade-off is reduced in the Silane A formulations, an improvement compared to TESPT formulations. The dynamic stiffness at 0° C. is considered an indicator for irregular treadwear (see U.S. Pat. No. 6,046,266, incorporated by reference). Increased stiffness reduces irregular wear. Based on this indicator, Table 2 shows that Silane A further reduces the gap in performance of silica filled rubber with respect to this feature, as compared to compounds formulated with carbon black. Thus, Silane A can reduce the trade-off in tire handling and irregular treadwear, improve tire durability, match the abrasion resistance of carbon black, and also reduce the hysteresis of the tire formulation. As also shown in Table 2, tire rolling resistance, related to the deformation of a tire at a frequency of 10-100 HZ and a temperature of 50-70° C., is proportional to tan δ, a ratio of viscous modulus to elastic modulus under cyclic deformation. Table 2 shows that Silane A containing rubber compounds can have lower tan δ values than the N121-carbon black control. Thus, it appears that Silane A can minimize trade-off in wear resistance and rolling resistance in truck tire formulations.

Comparative Examples III and IV and Examples 5 and 6

Table 3, below, lists the 100% Natural Rubber formulations for the carbon black control, the TESPT, and the Silane A with Resorcinol, and Silane A with Penacolite and silica reinforced compounds.

TABLE 3

| Ingredients | Comp. Ex. III Carbon Black | Comp. Ex. IV TESPT | Example 5 Resorcinol | Example 6 Penacolite |
|---|---|---|---|---|
| 1st Non-Productive | | | | |
| Natural Rubber[1] | 100 | 100 | 100 | 100 |
| Silica[2] | 0.0 | 50.0 | 50.0 | 50.0 |
| Carbon Black[3] | 25.0 | 5.0 | 5.0 | 5.0 |
| TDAE Process Oil | 1.0 | 1.0 | 1.0 | 1.0 |
| TESPT silane | 0.0 | 4.0 | 0.0 | 0.0 |
| Silane A | 0.0 | 0.0 | 6.0 | 6.0 |
| Zinc Oxide | 1.5 | 1.5 | 1.5 | 1.5 |
| Stearic Acid | 1.0 | 1.0 | 1.0 | 1.0 |
| NP1 Total | 128.5 | 162.5 | 164.5 | 164.5 |
| 2nd Non-Productive | | | | |
| Carbon Black | 25.0 | 5.0 | 5.0 | 5.0 |
| 6-PPD[4] | 2.0 | 2.0 | 2.0 | 2.0 |
| TMQ[5] | 0.5 | 0.5 | 0.5 | 0.5 |
| Microcystalline Wax | 1.3 | 1.3 | 1.3 | 1.3 |
| Zinc Oxide | 1.5 | 1.5 | 1.5 | 1.5 |
| Stearic Acid | 1.0 | 1.0 | 1.0 | 1.0 |
| Hexa(methoxymethyl) melamine (HMMM) | 0.0 | 0.0 | 1.25 | 1.25 |
| NP2 Total | 159.8 | 173.8 | 177.1 | 177.1 |

TABLE 3-continued

| Ingredients | Comp. Ex. III Carbon Black | Comp. Ex. IV TESPT | Example 5 Resorcinol | Example 6 Penacolite |
|---|---|---|---|---|
| 3rd Non-Productive | | | | |
| Resorcinol | 0.0 | 0.0 | 0.63 | 0.0 |
| Penacolite Resin B-19-SC | 0.0 | 0.0 | 0.0 | 1.1 |
| NP3 Total | 159.8 | 173.8 | 177.7 | 178.2 |
| Productive | | | | |
| Sulfur | 1.600 | 1.600 | 1.600 | 1.600 |
| CBS[6] | 1.100 | 2.000 | 2.000 | 2.000 |
| DPG[7] | 0.4 | 0.4 | 0.4 | 0.4 |
| FM Total | 162.9 | 177.8 | 181.7 | 182.2 |

[1] Natural Rubber cis 1, 4-polyisoprene) - as SIR 20- Standard:Indonesian Rubber
[2] Zeosil 1165MP- Solvay
[3] N121 Carbon black-Columbian Chemicals Company
[4] N-1,3-dimethylbutyl-N-phenyl-para-phenylenediamine-Harwick Standard Distribution Corporation
[5] 2,2,4-Trimethyl-1,2-Dihydroquinoline polymer-NOCIL
[6] N-Cyclohexyl-2-benzothiazole sulfonamide- Harwick Standard Distribution Corporation
[7] Diphenylguanidine- Harwick Standard Distribution Corporation All four formulations were mixed in the manner described in Example 1. The physical and dynamic properties are shown in Table 4.

TABLE 4

| Sample | Comp. Ex. III Carbon black | Comp. Ex. IV TESPT | Example 5 Resorcinol | Example 6 Penacolite |
|---|---|---|---|---|
| Mooney | | | | |
| Plasticity ML 1 + 4 at 100° C. | 48.9 | 47.6 | 69.6 | 72.3 |
| Scorch Ts3 Rheometer, 160° C. | 7.7 | 12.6 | 12.5 | 13.5 |
| Max. Torque, dNm | 19.37 | 19.40 | 17.89 | 17.31 |
| Min. Torque, dNm | 1.93 | 1.66 | 2.54 | 2.62 |
| Delta Torque, dNm | 17.4 | 17.7 | 15.4 | 14.7 |
| Stress-Strain | | | | |
| Tensile Strength, MPa | 22.4 | 23.0 | 22.3 | 22.2 |
| Elongation @ Break, % | 469 | 504 | 444 | 466 |
| 100% Modulus, MPa | 2.4 | 2.2 | 2.2 | 2.1 |
| 300% Modulus, MPa | 13.9 | 13.2 | 14.7 | 13.6 |
| Reinforcing Index | 5.8 | 6.1 | 6.7 | 6.6 |
| Shore A Hardness | | | | |
| 25° C. | 62.9 | 63.0 | 62.2 | 62.1 |
| 70° C. | 60.1 | 59.7 | 58.9 | 58.5 |
| Durability | | | | |
| Graves Tear (100° C.), N/mm | 71.7 | 79.1 | 62.8 | 67.0 |
| High Speed Tear Energy (HSTE), MJ/m³ | 10.0 | 10.7 | 9.3 | 11.0 |
| Heat Buildup, °C. | 15.6 | 9.6 | 11.8 | 16.1 |
| Abrasion Resistance | | | | |
| DIN Abrasion loss, mm³ | 96.2 | 117.3 | 96.0 | 103.4 |
| Eplexor, cured compound | | | | |
| E' @ 10% strain, 55° C. (Strain Sweep), MPa | 4.47 | 4.23 | 4.44 | 4.33 |
| Tan δ @ 10% strain, 55° C. (Strain Sweep) | 0.133 | 0.100 | 0.115 | 0.123 |
| E' @ 60° C. (Temp. Sweep), MPa | 7.85 | 6.03 | 6.51 | 6.40 |
| Tan δ @ 60° C. (Temp. Sweep) | 0.117 | 0.078 | 0.081 | 0.087 |
| E' 30° C. (Temp, Sweep), MPa | 9.26 | 6.57 | 7.29 | 7.18 |
| E' @ 0° C. (Temp. Sweep), MPa | 12.44 | 8.68 | 9.71 | 9.59 |
| Tan δ @ 0° C. (Temp. Sweep) | 0.190 | 0.166 | 0.161 | 0.166 |
| RPA strain sweep, cured compound | | | | |
| G' @ 10% strain, 60° C. | 1.15 | 0.95 | 1.24 | 1.23 |
| Tan δ @ 10% strain, 60° C. | 0.270 | 0.219 | 0.193 | 0.197 |
| Rebound | | | | |
| 70° C. | 54.9 | 60.5 | 58.9 | 59.5 |
| 100° C. | 61.3 | 64.1 | 63.1 | 63.1 |

The trends observed in the Mooney cure, physical durability, abrasion resistance, and dynamic properties are similar to the NR/BR formulation previously shown in Table 2. One key difference is the greater improvement in the 70° C. and 100° C. Rebound values. Silane A, when compounded with a network forming polymer (especially the same thermosetting resin), the composition can be compounded with a silica filled rubber to provide tire tread that significantly minimizes the trade-off in wear resistance and rolling resistance in tire formulations. Other benefits include improved tire durability, and less compromise in tire handling and irregular treadwear. It is a promising option for steer and drive truck tires that are compounded using NR/BR blends as well as trailer tires which containing higher levels of NR.

Comparative Examples V-IX and Example 7—Rubber Compositions

Table 5, below, lists the ingredients used for preparing rubber compositions using 100% Natural Rubber, together with N234 carbon black control and the TESPT and Silane A with resorcinol silica compounds. The compounds were evaluated with and without the secondary polymer network to highlight the synergy of the network with the silane compounds.

TABLE 5

| Ingredients | Comp. Ex. V Carbon black | Comp. Ex.VI Carbon black - network | Comp. Ex. VII TESPT | Comp. Ex. VIII TESPT-network | Comp. Ex. IX Silane A | Example 7 Silane A-network |
|---|---|---|---|---|---|---|
| 1st Non-Productive | | | | | | |
| Natural Rubber [1] | 100 | 100 | 100 | 100 | 100 | 100 |
| Silica [2] | 0.0 | 0.0 | 40.0 | 40.0 | 40.0 | 40.0 |
| Carbon Black [3] | 43.5 | 43.5 | 10.0 | 10.0 | 10.0 | 10.0 |
| TESPT | 0.0 | 0.0 | 3.2 | 3.2 | 0.0 | 0.0 |
| 6-PPD [4] | 1.5 | 1.5 | 1.5 | 1.5 | 1.5 | 1.5 |
| TMQ [5] | 1.0 | 1.0 | 1.0 | 1.0 | 1.0 | 1.0 |
| DPTD [6] | 1.0 | 1.0 | 1.0 | 1.0 | 1.0 | 1.0 |
| Microcrystalline Wax | 2.5 | 2.5 | 2.5 | 2.5 | 2.5 | 2.5 |
| Silane A | 0.0 | 0.0 | 0.0 | 0.0 | 4.8 | 4.8 |
| Zinc Oxide | 3.0 | 3.0 | 3.0 | 3.0 | 3.0 | 3.0 |
| Stearic Acid | 2.0 | 2.0 | 2.0 | 2.0 | 2.0 | 2.0 |
| NP1 Total | 154.5 | 154.5 | 164.2 | 164.2 | 165.8 | 165.8 |
| 2nd Non-Productive | | | | | | |
| HMMM[7] | 0.0 | 1.0 | 0.0 | 1.0 | 0.0 | 1.0 |
| NP2 Total | 154.5 | 155.5 | 164.2 | 165.2 | 165.8 | 166.8 |
| 3rd Non-Productive | | | | | | |
| Resorcinol | 0.0 | 0.5 | 0.0 | 0.5 | 0.0 | 0.5 |
| NP3 Total | 154.5 | 156.0 | 164.2 | 165.7 | 165.8 | 167.3 |
| Productive | | | | | | |
| Sulfur | 1.800 | 1.800 | 1.368 | 1.368 | 1.800 | 1.800 |
| CBS [8] | 1.100 | 1.100 | 2.000 | 2.000 | 2.000 | 2.000 |
| DPG [9] | 0.0 | 0.0 | 0.400 | 0.400 | 0.0 | 0.0 |
| FM Total | 157.4 | 158.9 | 168.0 | 169.5 | 169.6 | 171.1 |

Figure 3:
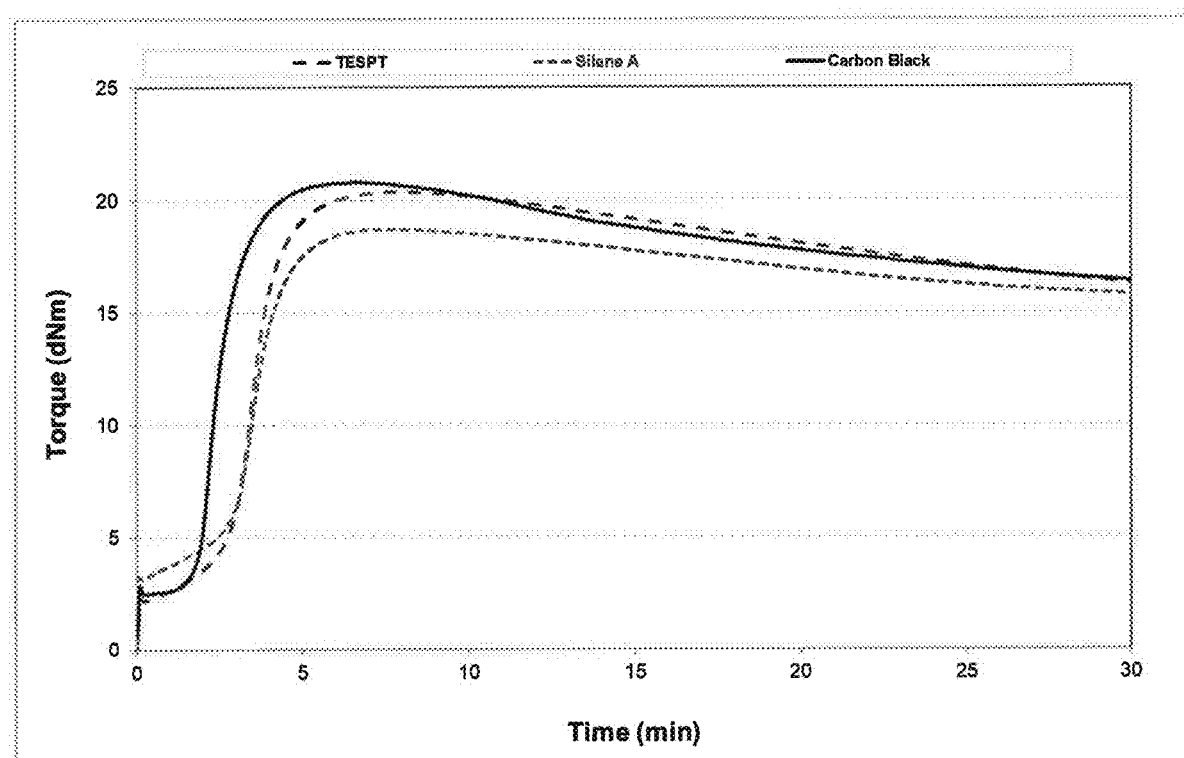
FIG. 3 is a graph of the change of torque with time, showing that the cure rate for TESPT containing compounds was similar to that for Silane A containing compounds and carbon black containing compounds.

[1] Natural Rubber (cis 1, 4-polyisoprene) - as SIR 20 - Standard Indonesian Rubber
[2] Zeosil 1165MP - Solvay
[3] N220 Carbon black - Columbian Chemicals Company
[4] N-1,3-dimethylbutyl-N-phenyl-para-phenylenediamine - Harwick Standard Distribution Corporation
[5] 2,2,4-Trimethyl-1,2-Dihydroquinoline polymer-NOCIL
[6] Dipentamethylene Thiuram Disulphide - as Antiozonant MPD-100 - Akrochem Corporation
[7] HMMM is hexa(methoxymethyl)melamine
[8] N-Cyclohexyl-2-benzothiazole sulfonamide - Harwick Standard Distribution Corporation
[9] Diphenylguanidine - Harwick Standard Distribution Corporation The cure package for the TESPT formulations was selected to ensure that the cure rate for TESPT containing compounds was similar to that for Silane A containing compounds and carbon black containing compounds (See FIG. 3). All Silane A formulations were mixed in the manner described for Example 3. The carbon black formulation without resorcinol and hexa(methoxymethyl)melamine was also mixed as described for Example 3. The TESPT formulation without resorcinol and hexa(methoxymethyl)melamine was heat treated for 90 seconds at 155° C. during all 3 non-productive (non-curing) passes. The carbon black and TESPT formulations containing resorcinol and hexa(methoxymethyl)melamine were mixed similarly to the formulations without the network forming polymer ingredients. The only difference was that the heat treatment for 3$^{rd}$ mixing passes were done for 150 sec. at 140° C. (similar to the Silane A formulations). This was done to minimize the premature reaction between resorcinol and hexa(methoxymethyl)melamine during the 3$^{rd}$ mixing pass. The physical and dynamic properties are shown in Table 6, below.

TABLE 6

| Sample | Comp. Ex. V | Comp. Ex. VI | Comp. Ex. VII | Comp. Ex. VIII | Comp. Ex. IX | Example 7 |
|---|---|---|---|---|---|---|
| Mooney | | | | | | |
| Plasticity ML1 + 4 at 100° C. | 36.9 | 40.9 | 42.7 | 49.5 | 46.4 | 53.2 |
| Scorch Ts3 | 14.3 | 13.0 | 18.6 | 15.3 | 20.1 | 13.3 |
| Rheometer, 160° C. | | | | | | |
| Max. Torque, dNm | 15.92 | 17.36 | 15.10 | 16.92 | 15.47 | 15.63 |
| Min. Torque, dNm | 1.40 | 1.65 | 1.37 | 1.81 | 1.35 | 1.83 |
| Delta Torque, dNm | 14.5 | 15.7 | 13.7 | 15,1 | 14.1 | 13.8 |

TABLE 6-continued

| Sample | Comp. Ex. V | Comp. Ex. VI | Comp. Ex. VII | Comp. Ex. VIII | Comp. Ex. IX | Example 7 |
|---|---|---|---|---|---|---|
| Stress-Strain | | | | | | |
| Tensile Strength, MPa | 22.7 | 22.4 | 22.6 | 22.7 | 21.4 | 22.9 |
| Elongation @ Break, % | 549 | 533 | 570 | 552 | 597 | 537 |
| 100% Modulus, MPa | 1.8 | 2.0 | 1.7 | 1.9 | 1.5 | 1.8 |
| 300% Modulus, MPa | 10.2 | 10.7 | 9,6 | 10.4 | 8.0 | 10.7 |
| Reinforcing Index | 5.7 | 5.4 | 5.6 | 5.6 | 5.3 | 5.9 |
| Shore A Hardness | | | | | | |
| 25° C. | 57.3 | 60.5 | 56.9 | 60.9 | 56.2 | 58.3 |
| 70° C. | 52.5 | 56.6 | 52.9 | 57.1 | 53.8 | 55.0 |
| Durability | | | | | | |
| Graves Tear (100° C.), N/mm | 67.7 | 77.5 | 76.4 | 79.3 | 77.2 | 66.8 |
| High Speed Tear Energy (HSTE), MJ/m$^3$ | 11.2 | 11.0 | 13.8 | 13.5 | 17.0 | 11.4 |
| Heat Buildup, ° C. | 10.7 | 11.6 | 10.9 | 8.4 | 7.8 | 8.1 |
| Abrasion Resistance | | | | | | |
| DIN Abrasion loss, mm$^3$ | 121.7 | 121.6 | 131.7 | 129.7 | 144.3 | 118.8 |
| RPA strain sweep, cured compound | | | | | | |
| G @ 10% strain, 60° C. | 0.8 | 0.9 | 0.7 | 1.0 | 0.9 | 0.9 |
| Tan δ @ 10% strain, 60° C. | 0.277 | 0.291 | 0.219 | 0.252 | 0.258 | 0.222 |
| Rebound | | | | | | |
| 70° C. | 61.7 | 57.7 | 63.7 | 64.0 | 61.4 | 66.1 |
| 100° C. | 64.3 | 60.8 | 67.8 | 67.0 | 64.7 | 69.2 |

The common effect of the polymer network on all the formulations included increased viscosity and reduced scorch safety. However, a synergy was evident between the network formed from resorcinol, hexa(methoxymethyl) melamine and Silane A, not seen in either the carbon black or TESPT formulations. Adding resorcinol and hexa(m-ethoxymethyl)melamine to the Silane A formulations and forming the secondary network increased the tensile strength, 300% modulus and reinforcing index, all indicators of increased reinforcement. This increase in reinforcement, with no change in delta torque, is indicative of better polymer-filler interaction. The network also improved the abrasion resistance and reduced the hysteresis of the Silane A containing compound.

Example 8—Preparation of Silane C

A melamine resin containing residual hydroxyl groups (19.0 grams, 0.048 mole) and ethyl N-(3-triethoxysilylpropyl)carbamate (14.4 grams, 0.049 mole, available from Momentive Performance Materials) were charged into a three neck round bottom flask equipped with a magnetic stirrer, a short-path distillation head, a heating mantle, and a temperature controller. The contents were heated to 100° C. under a vacuum of about 46 mmHg at which time sulfuric acid (0.0097 gram) and dodecylbenzene sulfonic acid 70% in isopropyl alcohol were then added to the reaction flask. The contents were heated from 120° C. to 155° C. under 42 to 47 mmHg of vacuum for 5 hours. Low boiling compounds (4.8 grams) were removed. A total of 103 grams of low boiling compounds and 1198.7 grams of Silane C product were recovered. The reaction was followed using GC.

Example 9—Preparation of Silane D

A melamine resin containing residual hydroxyl groups (83.2 grams, 0.213 mole), ureidopropyltrimethoxysilane (48.2 grams, 0.217 mole, available from Momentive Performance Materials), and a non-reactive high-boiling solvent, 2,6,10,14-tetramethylpentadecane (34.2 grams) were charged into a three neck round bottom flask equipped with a magnetic stirrer, a short-path distillation head, a heating mantle, and a temperature controller. The contents were heated to 140° C. at atmospheric pressure for 1.5 hours. Dodecylbenzene sulfonic acid (0.65 gram) was then added to the reaction flask. The contents were heated at 140° C. for another 1.5 hours. Low boiling compounds (about 2 grams) were removed. The reaction mixture was separated into 2 phases. The top phase was determined by gas chromatography to be 2,6,10,14-tetramethylpentadecane and Silane D. The amount of the top phase was 134.2 grams. The bottom phase was determined by gas chromatography to be methanol. 134.2 grams of Silane D product in 2,6,10,14-tetramethylpentadecane were recovered.

Example 10-Preparation of Silane E

A 200 mL round bottomed flask equipped with a mechanical stirrer, short-path distillation head, dry ice cooled receiver, heating mantle and nitrogen inlet, was charged 50.58 grams of 1,3,4,6-tetrakis(methoxymethyl)glycouril and 27.22 grams of methyl alcohol. The mixture was heated to 55° C. Subsequently, 38.9 grams of 3-mercaptopropyltriethoxysilane and 0.0381 g of dodecylbenzenesulfonic acid solution (70% in isopropanol) was added to the reaction flask, which was then heated to 70° C. under 530 mmHg. Over a period of five hours, the temperature was maintained at 70 C while the pressure was lowered from 530 mmHg to 60 mmHg until the concentration of 3 mercaptopropyltriethoxysilane was non-detectable by GC. 32.53 grams of lites were recovered. 78.32 grams of product were recovered.

Example 11—Preparation of Silane F

A 500 mL round bottom flask equipped with a 5-plate Oldershaw column, short-path distillation head, mechanical stirrer, dry-ice cooled receiver, heating mantle and nitrogen inlet, was charged 269.7 grams of Hexabutoxymethyl melamine (Allnex Cymel 1156), and 100.0 grams of 3-mercaptopropyltriethoxysilane and heated to 40° C. under atmospheric pressure. 0.2176 grams of dodecylbenzenesulfonic acid solution (70% in isopropanol) was then added to the reaction flask, which was subsequently heated to 90° C. under 400 mmHg. Over a period of 9 hours, the temperature was maintained at 90° C. while the pressure was lowered from 400 mmHg to 30 mmHg to until the concentration of 3-mercaptopropyltriethoxysilane was non-detectable by GC. 33.5 grams of lites were recovered. 229.8 grams of product were recovered, having a viscosity of approximately 2700 cSt.

Example 12—Preparation of Silane G

In a 500 mL round bottom flask equipped with a 5-plate Oldershaw column, short-path distillation head, mechanical stirrer, dry-ice cooled receiver, heating mantle and nitrogen inlet, was charged 167.7 grams of methylated benzoguanamine formaldehyde resin at 80% in n-butanol (Ineos Maprenal MF 984-80B Resin), and 100.0 grams of 3-mercaptopropyltriethoxysilane and heated to 40 C under atmospheric pressure. 0.2545 grams of dodecylbenzenesulfonic acid solution (70% in isopropanol) was then added to the reaction flask, which was subsequently heated to 90° C. under 400 mmHg. Over a period of 8 hours, the temperature was maintained at 90° C. while the pressure was lowered from 400 mmHg to 30 mmHg until the concentration of 3-mercaptopropyltriethoxysilane was non-detectable by GC. 46.2 grams of lites were recovered. 212.5 grams of product was recovered, having a viscosity greater than 14800 cSt.

Example 13—Preparation of Silane H

In a 1000 mL round bottom flask equipped with a 5-plate Oldershaw column, short-path distillation head, mechanical stirrer, dry-ice cooled receiver, heating mantle and nitrogen inlet, was charged 366.3 g of HMMM Resimene 3520 and 122.89 grams 1-octanol, which were stirred at ambient temperature until the mixture turned homogeneous, at which point 0.5271 grams dodecylbenzenesulfonic acid solution (70% in isopropanol) was also charged. The reaction flask was then heated to 100° C. under a vacuum of 60 mmHg. After 4 hours at 100° C. and 60 mmHg, the concentration of 1-octanol was non-detectable by GC. 224.11 grams of 3-mercaptopropyltriethoxysilane were subsequently added to the reaction flask, which was then heated to 90° C. under 40 mmHg, and subsequently held for 6 hours until the 3-mercaptopropyltriethoxysilane concentration was non-detectable by GC. 647.8 grams of product was recovered.

Comparative Example X and Example 3—Rubber Compositions

Table 7, below, lists the same ingredients used in table 1, and compares Silane E with silane A, and comparative examples I and II. Silanes A and E were evaluated at equal loadings.

TABLE 7

| Ingredients | Comp. Ex. I Carbon black formulation | Comp. Ex II TESPT formulation | Example 3 Resorcinol formulation | Comp. Ex X Silane E formulation |
|---|---|---|---|---|
| 1st Non-Productive | | | | |
| Natural Rubber[1] | 80.0 | 80.0 | 80.0 | 80.0 |
| cis 1,4-Polybutadiene[2] | 20.0 | 20.0 | 20.0 | 20.0 |
| Silica[3] | 0.0 | 50.0 | 50.0 | 50.0 |
| Carbon Black[4] | 25.0 | 5.0 | 5.0 | 5.0 |
| TDAE Process Oil | 1.0 | 1.0 | 1.0 | 1.0 |
| TESPT | 0.0 | 4.0 | 0.0 | 0.0 |
| Silane A | 0.0 | 0.0 | 6.0 | 0.0 |
| Slian E | 0.0 | 0.0 | 0.0 | 6.0 |
| Zinc Oxide | 1.5 | 1.5 | 1.5 | 1.5 |
| Stearic Acid | 1 | 0 | 1.0 | 1.0 |
| Non-productive Mix 1 Total | 128.5 | 162.5 | 164.5 | 164.5 |
| 2nd Non-Productive | | | | |
| Carbon Black | 25.0 | 5.0 | 5.0 | 5.0 |
| 6-PPD[5] | 2.0 | 2.0 | 2.0 | 2.0 |
| TMQ[6] | 0.5 | 0.5 | 0.5 | 0.5 |
| Microcystalline Wax | 1.3 | 1.3 | 1.3 | 1.3 |
| Zinc Oxide | 1.5 | 1.5 | 1.5 | 1.5 |
| Stearic Acid | 1.0 | 1.0 | 1.0 | 1.0 |
| Hexa(methoxymethyl) melamine (HMMM) | 0.0 | 0.0 | 1.25 | 0.0 |
| Methoxy methyl glycouril | 0.0 | 0.0 | 0.0 | 1.25 |
| Non-productive Mix 2 Total | 159.8 | 173.8 | 177.1 | 177.1 |
| 3rd Non-Productive | | | | |
| Resorcinol | 0.0 | 0.0 | 0.63 | 0.63 |
| Non-productive Mix 3 Total | 159.8 | 173.8 | 177.7 | 177.7 |
| Productive Mix | | | | |
| Sulfur | 1.600 | 1.600 | 1.600 | 1.600 |
| CBS[7] | 1.100 | 2.000 | 2.000 | 2.000 |
| DPG[8] | 0.4 | 0.4 | 0.4 | 0.4 |
| Rubber Composition Total | 162.9 | 177.8 | 181.7 | 181.7 |

All four formulations were mixed in the manner described in Example 1. The physical and dynamic properties are shown in Table 8.

TABLE 8

| Sample | Comp. Ex. I Carbon black formulation | Comp. Ex II TESPT formulation | Example 3 Resorcinol formulation | Example X Silane E formulation |
|---|---|---|---|---|
| Mooney | | | | |
| Plasticity ML1 + 4 at 100° C. | 65.9 | 57.4 | 77.6 | 65.1 |
| Scorch Ts3 | 7.4 | 12.2 | 9.4 | 10.8 |
| Rheometer, 160° C. | | | | |
| Max. Torque, dNm | 21.32 | 21.64 | 19.38 | 25.71 |
| Min. Torque, dNm | 2.66 | 2.07 | 2.87 | 2.82 |
| Delta Torque, dNm | 18.7 | 19.6 | 16.5 | 22.9 |
| Stress-Strain | | | | |
| Tensile Strength, MPa | 22.4 | 22.4 | 22.5 | 20.7 |
| Elongation @ Break, % | 461 | 497 | 474 | 570 |
| 100% Modulus, MPa | 2.4 | 2.4 | 2.3 | 2.3 |
| 300% Modulus, MPa | 14.2 | 13.0 | 13.7 | 9.6 |
| Reinforcing Index | 5.8 | 5.5 | 5.9 | 4.2 |
| Shore A Hardness | | | | |
| 25° C. | 64.1 | 63.6 | 64.0 | 71.7 |
| 70° C. | 60.6 | 61.6 | 61.5 | 66.7 |
| Durability | | | | |
| Graves Tear (100° C.), N/mm | 60.5 | 59.2 | 55.3 | 65.2 |
| High Speed Tear Energy (HSTE), $MJ/m^3$ | 7.8 | 7.7 | 7.5 | 11.2 |
| Abrasion Resistance | | | | |
| DIN Abrasion loss, $mm^3$ | 76.4 | 87.5 | 80.1 | 128.7 |
| RPA strain sweep, cured compound | | | | |
| G' @ 10% strain, 60° C. | 1.5 | 1.3 | 1.5 | 2.1 |
| Tan δ @ 10% strain, 60° C. | 9.255 | 0.193 | 0.178 | 0.305 |
| Rebound | | | | |
| 70° C. | 57.1 | 62.6 | 59.5 | 48.6 |
| 100° C. | 61.0 | 66.1 | 63,0 | 53.9 |

The chemical structure of silane E implies that it should perform similarly to Silane A, but the data in table 8 show that this is clearly not the case. Aside from having a different plasticity and cure profile, the comparative example X compound also has an overall lower reinforcement compared to example 3. This is reflected in the lower tensile strength, 300% modulus, reinforcing index, and abrasion resistance. It appears that silane E forms a softer, non-reinforcing network, and this also has a negative impact on the rolling resistance indicators as seen in the rebound and tan δ values in table 8. Thus, without optimization, not all polymeric networks can provide the level of reinforcement needed to meet the performance requirements for a tire tread formulation, such as the one in table 7.

The process for preparing a hydrolyzable alkoxymethyl-amino-functional silane, without the need of a catalyst, could also occur in situ in a rubber composition comprising a rubber polymer (a) and a reinforcing filler (b) having water bound thereto, and wherein the silane containing a functional group forms silanols by reacting with the water bound to the reinforcing filler and said silanols react with the reinforcing filler to form a plurality of covalent chemical bonds with the filler. The formulation in table 9 compares silane A with combinations of mercapto-containing silanes with reinforcing resins in predetermined ratios.

TABLE 9

| Ingredients | Comp. Ex. XI | Comp. Ex XII | Comp. Ex XIII | Comp. Ex XIV | Example 3 |
|---|---|---|---|---|---|
| 1st Non-Productive | | | | | |
| Natural Rubber[1] | 80.0 | 80.0 | 80.0 | 80.0 | 80.0 |
| cis 1,4-Polybutadiene[2] | 20.0 | 20.0 | 20.0 | 20.0 | 20.0 |
| Silica[3] | 0.0 | 50.0 | 50.0 | 50.0 | 50.0 |
| Carbon Black[4] | 25.0 | 5.0 | 5.0 | 5.0 | 5.0 |
| TDAE Process Oil | 1.0 | 1.0 | 1.0 | 1.0 | 1.0 |
| HMMM | 3.77 | 3.77 | 3.72 | 3.72 | 3.72 |
| Silane A | 0.0 | 0.0 | 0.0 | 0.0 | 6.0 |
| NXT Silane | 3.48 | 0.0 | 0.0 | 0.0 | 0.0 |
| NXT Z45 Silane | 0.0 | 4.20 | 0.0 | 0.0 | 0.0 |
| NXT Z100 Silane | 0.0 | 0.0 | 3.535 | 0.0 | 0.0 |
| A-1891 Silane | 0.0 | 0.0 | 0.0 | 2.274 | 0.0 |
| Zinc Oxide | 1.5 | 1.5 | 1.5 | 1.5 | 1.5 |
| Stearic Acid | 1.0 | 1.0 | 1.0 | 1.0 | 1.0 |
| Non-productive Mix 1 Total | 165.7 | 166.4 | 165.8 | 164.5 | 164.5 |
| 2nd Non-Productive | | | | | |
| Carbon Black | 25.0 | 5.0 | 5.0 | 5.0 | 5.0 |
| 6-PPD[5] | 2.0 | 2.0 | 2.0 | 2.0 | 2.0 |
| TMQ[6] | 0.5 | 0.5 | 0.5 | 0.5 | 0.5 |
| Microcystalline Wax | 1.3 | 1.3 | 1.3 | 1.3 | 1.3 |

TABLE 9-continued

| Ingredients | Comp. Ex. XI | Comp. Ex XII | Comp. Ex XIII | Comp. Ex XIV | Example 3 |
|---|---|---|---|---|---|
| Zinc Oxide | 1.5 | 1.5 | 1.5 | 1.5 | 1.5 |
| Stearic Acid | 1.0 | 1.0 | 1.0 | 1.0 | 1.0 |
| Hexa(methoxymethyl) melamine (HMMM) | 1.25 | 1.25 | 1.25 | 1.25 | 1.25 |
| Non-productive Mix 2 Total | 178.3 | 179.0 | 178.3 | 177.0 | 177.1 |
| 3rd Non-Productive | | | | | |
| Resorcinol | 0.63 | 0.63 | 0.63 | 0.63 | 0.63 |
| Non-productive Mix 3 Total | 178.9 | 179.6 | 178.9 | 177.7 | 177.7 |
| Productive Mix | | | | | |
| Sulfur | 1.600 | 1.600 | 1.600 | 1.600 | 1.600 |
| CBS[7] | 2.000 | 2.000 | 2.000 | 2.000 | 2.000 |
| DPG[8] | 0.4 | 0.4 | 0.4 | 0.4 | 0.4 |
| Rubber Composition Total | 182.9 | 183.6 | 182.9 | 181.7 | 181.7 |

The physical and dynamic properties are shown in Table 10 below.

TABLE 10

| Sample | Comp. Ex XI | Comp. Ex. XII | Comp. Ex XIII | Comp. Ex XIV | Example 3 |
|---|---|---|---|---|---|
| Mooney | | | | | |
| Plasticity ML1 + 4 at 100° C. | 73.2 | 75.7 | 74.8 | 79.0 | 81.0 |
| Scorch Ts3 | 11.9 | 10.2 | 10.3 | 12.1 | 11.6 |
| Rheometer, 160° C. | | | | | |
| Max. Torque, dNm | 17.97 | 21.64 | 21.79 | 19.58 | 19.87 |
| Min. Torque, dNm | 2.60 | 2.96 | 2.98 | 3.25 | 3.03 |
| Delta Torque, dNm | 15.4 | 18.7 | 18.8 | 16.3 | 16.8 |
| Stress-Strain | | | | | |
| Tensile Strength, MPa | 22.7 | 23.1 | 23.3 | 23.3 | 23.4 |
| Elongation @ Break, % | 530 | 507 | 500 | 495 | 491 |
| 100% Modulus, MPa | 2.2 | 2.6 | 2.6 | 7.3 | 2.4 |
| 300% Modulus, MPa | 17.1 | 13.4 | 13.6 | 13.4 | 13.7 |
| Reinforcing Index | 5.5 | 5.1 | 5.3 | 5.8 | 5.8 |
| Shore A Hardness | | | | | |
| 25° C. | 62.8 | 67.8 | 66.9 | 65.0 | 64.3 |
| 70° C. | 60.0 | 64.2 | 63.9 | 62.5 | 62.1 |
| Durability | | | | | |
| Graves Tear (100° C.), N/mm | 63.0 | 63.7 | 60.6 | 66.7 | 71.1 |
| High Speed Tear Energy (HSTE), MJ/m[3] | 8.4 | 8.1 | 7.5 | 7.5 | 7.6 |
| Abrasion Resistance | | | | | |
| DIN Abrasion loss, mm[3] | 85.6 | 83.8 | 80.7 | 78.4 | 76.6 |
| RPA strain sweep, cured compound | | | | | |
| G' @ 10% strain, 60° C. | 1.3 | 1.8 | 1.8 | 1.6 | 1.7 |
| Tan δ @ 10% strain, 60° C. | 0.168 | 0.230 | 0.226 | 0.185 | 0.186 |
| Rebound | | | | | |
| 70° C. | 58.9 | 55.4 | 56.0 | 58.3 | 59.0 |
| 100° C. | 62.4 | 58.8 | 59.1 | 60.5 | 61.2 |

From table 10, it appears that combining gamma-mercaptopropyltriethoxysilane with HMMM in the first non-productive pass gives similar physical and dynamic properties as silane A, indicating the possibility of in-situ formation of silane A and the subsequent network upon curing of the compound.

However, the network structure indicators from rheology show that this is not the case. The RPA 2000 from Alpha Technologies was used to run strain sweep from 0.25% to 500% strain at 1 Hz, and with testing temperature maintained at 170° C. applied to compound example XIV and compound example 3 of table 9. The resulting empirical data suggested that the size of silica-silane A aggregates increases from one nonproductive stage to the next. This is not the case with example XIV.

Work by R. Hentschke et al. 2017 suggests that information about aggregate size can be obtained from the Payne effect curve. The formula shown below is used to fit the Payne effect data:

$$\Delta G'(u) = \frac{\Delta G'_0}{\left(1 + \frac{D}{d}u\right)y} \cdot x(T)$$

where D denotes the average diameter of the filler aggregates and d denotes the distance between aggregates. The term x(T), captures the dependence of ΔG' (u) on temperature, x(T) is independent of the shell diameter or inter-aggregate distance. The variable u reflects the strain, and y is a fractal number, typically in the range 0.5 to 2. Finally, $\Delta G'_0$ is the Payne effect at low strain amplitude, whereas ΔG' (u) is the 'Payne effect' at arbitrary amplitude. Quantitative rigor of this model holds for case D/d>1. The model was adopted empirically for case D/d<1, which suggests monotonically increasing diameter to distance ratio (D/d) as Silane A is added to silica in first nonproductive stage, and as HMMM is added to the mixture in second nonproductive stage and joined by resorcinol in the third nonproductive stage.

Aggregate size data was proved to be independent of the Payne effect. The Shell dimensions of Silane A's Network grew in size whereas the in situ blend of HMMM with gamma-mercaptopropyltriethoxysilane decreased in size by contrast, while the Payne effect data were identical. The table below illustrates this.

TABLE 11

| | Payne Effect | D/d | | |
|---|---|---|---|---|
| | NP1 | NP1 | NP2 | NP3 |
| Silane A | 1354 | 0.07 | 0.12 | 0.16 |
| Mercapto & Hmmm | 1366 | 0.18 | 0.16 | 0.09 |

While the invention has been described with reference to particular embodiments, those skilled in the art will understand that various changes may be made, and equivalents may be substituted for elements thereof without departing from the scope of the invention. It is intended that the invention not be limited to the particular embodiments disclosed, but that it includes all embodiments falling within the scope of the appended claims.

What is claimed is:

1. A hydrolyzable alkoxymethylamino-functional silane, comprising:
   at least one hydrolyzable silyl group and at least one alkoxymethylamino-functional group, wherein the alkoxymethylamino-functional group and the hydrolyzable silyl group are each bonded to an $sp^2$ carbon atom on an organic group to form a N—C covalent bond, and wherein the at least one alkoxymethylamino-functional group has the structure $(R^1OCH_2)_2N$—     (I)

where $R^1$ is independently hydrogen, an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms; and
   the at least one hydrolyzable silyl group has the chemical Formula (II):

$(R^2O)_aR^3{}_{3-a}SiR^4XN$—     (II)

wherein
   each $R^2$ is independently hydrogen, an alkyl group having from 1 to 10 carbon atoms and optionally at least one oxygen atom, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms;
   each $R^3$ is independently an alkyl group having from 1 to 3 carbon atoms or phenyl;
   $R^4$ is an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms;
   each X is a
   $SCH_2$—, $R^1OC(=O)NCH_2$—,

—$NR^1C(=O)N(R^1)CH_2$—, $R^1{}_2N(C=O)NCH_2$—,

—$NR^1(C=O)OCH_2$—, —$OCH_2$—, —$NR^1CH_2$— or —$OCH_2CH(OH)CH_2OCH_2$— group, wherein the methylene carbon atom of the group is bonded to the nitrogen atom, or —$NH(C=O)$—, —$OCH_2CH(OH)CH_2$— or a chemical bond which forms the bond between the $R^4$ group and the nitrogen atom shown in Formula (II); and
   the subscript a is an integer equal to 1, 2 or 3, with the proviso that the nitrogen atom shown in Formula (II) is bonded to a $sp^2$-hybridized carbon atom.

2. The hydrolyzable alkoxymethylamino-functional silane of claim 1, wherein the at least one of the hydrolyzable alkoxymethylamino-functional silanes has the chemical structure of Formulae III or IV or stereoisomers thereof:

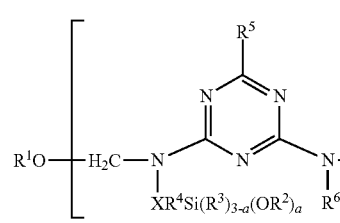
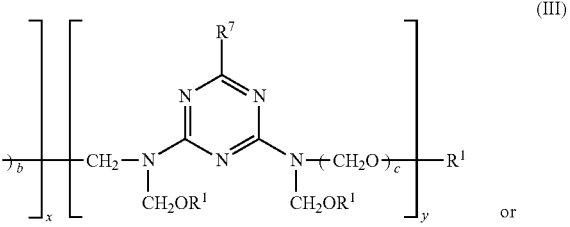

(III)

or

-continued

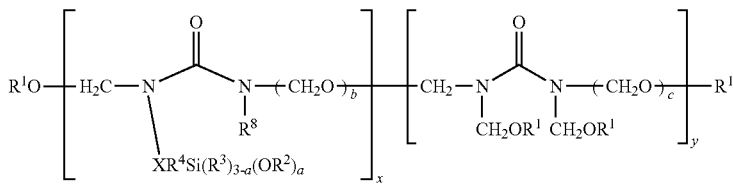

(IV)

wherein
- each $R^1$ is independently hydrogen, an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms;
- each $R^2$ is independently hydrogen, an alkyl group having from 1 to 10 carbon atoms and optionally at least one oxygen atom, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms;
- each $R^3$ is independently an alkyl group having from 1 to 3 carbon atoms or phenyl;
- each $R^4$ is independently an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms;
- each $R^5$ and $R^7$ is independently phenyl, $-N(CH_2OR^1)_2$, $-N(CH_2OR^1)(XR^4Si(R^3)_{3-a}(OR^2)_a)$, $-N(XR^4Si(R^3)_{3-a}(OR^2)_a)_2$,

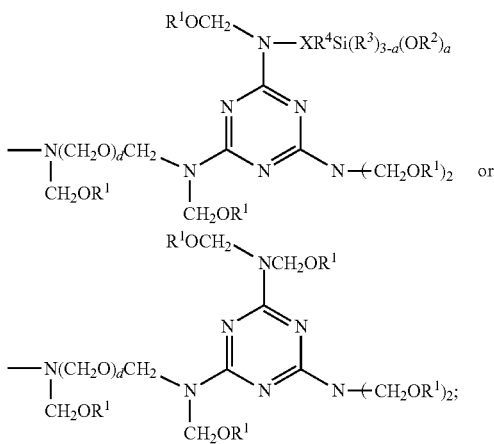

each $R^6$, $R^8$ and $R^9$ is independently hydrogen, $-CH_2OR^1$ or $-XR^4Si(R^3)_{3-a}(OR^2)_a$;
each X is independently $-SCH_2-$, $R^1OC(=O)NCH_2-$, $-NR^1C(=O)N(R^1)CH_2-$, $R^1{}_2N(C=O)NCH_2-$, $-NR^1(C=O)OCH_2-$, $-OCH_2-$,

or $-OCH_2CH(OH)CH_2OCH_2-$ group, where the methylene carbon atom of the group is bonded to the nitrogen atom, or $-NH(C=O)-$, $-OCH_2CH(OH)CH_2-$ or a chemical bond which forms the bond between the $R^4$ group and the nitrogen atom, with the proviso that the nitrogen atom is bonded to a $sp^2$-hybridized carbon atom; the subscripts a, b, c, d, x and y are independently integers where a is 1, 2 or 3; b is 0 or 1; c is 0 or 1; x is from 1 to 20; and y is from 0 to 20.

3. The hydrolyzable alkoxymethylamino-functional silane of claim 2, wherein
- each $R^1$ is independently an alkyl group having from 1 to 3 carbon atoms;
- each $R^2$ is independently an alkyl group having from 1 to 3 carbon atoms;
- each $R^3$ is independently an alkyl group having from 1 to 3 carbon atoms; each $R^4$ is independently an alkylene group having from 1 to 6 carbon atoms;
- each $R^5$ and $R^7$ is independently $-N(CH_2OR^1)_2$ or $-N(CH_2OR^1)(CH_2XR^4Si(R^3)_{3-a}(OR^2)_a)$;
- each $R^6$, $R^8$ and $R^9$ is $-CH_2OR^1$;
- each X is independently $-SCH_2-$ or $-NR^1CH_2-$ group; the subscripts a, b, c, d, x and y are independently integers where a is 3; b is 1; c is 1; x is 1, 2 or 3; and y is 0.

4. The hydrolyzable alkoxymethylamino-functional silane of claim 1, wherein said silane is selected from the group consisting of 1-(5-trimethoxysilyl-2-thiapentyl)-1,3,3-tris-methoxymethylurea, 1,3-bis-(1-(5-trimethoxysilyl-2-thiapentyl)-1,3-bis-methoxymethylurea, 3,3-bis-(3-dimethoxysilyl-2-thiapropyl)-1,1-bis-methoxymethylurea, 1-(5-triethoxysilyl-2-thiapentyl)-1,3,3-tetra-ethoxymethylurea, 1-(5-triethoxysilyl-2-aza-2-methyl-pentyl)-1,3,3-tris-ethoxymethylurea, 1,3-bis-(7-triethoxysilyl-2,4-diaza-3-oxo-heptyl)-1,3-bis-ethoxymethylurea, 3,3-bis-(1-(5-triethoxysilyl-2-thiapentyl)-1,1-bis-ethoxymethylurea, 1-(5-triethoxysilyl-2-thiapentyl)-1,3,3-tris-propoxymethylurea, 1-(5-triethoxysilyl-2-thiapentyl)-1,3,3-tris-propoxymethyl-urea, 1,3-bis-(5-tripropoxysilyl-2-thiapentyl)-1,3-bis-propoxymethylurea, 3,3-bis-(5-tripropoxysilyl-2-thiapentyl)-1,1-bis-propoxymethylurea, 1,3-bis-(5-tripropoxysilyl-2-thiapentyl)-1,3,3-tetra-butoxymethylurea, 1-(5-triphenoxysilyl-2-thiapentyl)-1,3,3-tetra-phenoxymethylurea, N-[1-(5-triethoxysilyl-2-thiapentyl)-1,3-tris-ethoxymethylureidomethyl]-1,3,3-tetra-ethoxymethylurea, N, N'-bis-[(1-(5-triethoxysilyl-2-thiapentyl)-1,3-bis-ethoxymethylureidomethyl]-1,3-bis-ethoxymethylurea, N, N'-bis-[1-(5-triethoxysilyl-2-thiapentyl)-1,3-bis-ethoxymethylureido-methoxymethyl]-1,3-bis-ethoxymethylurea, N-(5-triethoxysilyl-2-thiapentyl)-N,N',N',N'',N''-pentakis-methoxymethyl-[1,3,5]triazine-2,4,6-triamine, N, N''-bis-(5-triethoxysilyl-2-thiapentyl)-N,N',N',N''-tetrakis-methoxymethyl-[1,3,5]triazine-2,4,6-triamine, N',N''-(5-triethoxysilyl-2-thiapentyl)-N,N,N',N''-tetrakis-methoxymethyl-[1,3,5]triazine-2,4,6-triamine, N-(5-triethoxysilyl-2-aza-2-methyl-pentyl)-N,N',N',N'',N''- pentakis-ethoxymethyl-[1,3,5]triazine-2,4,6-triamine, N''-(7-triethoxysilyl-2,4-diaza-3-oxo-heptyl)-N,N,N',N',N''-pentakis-ethoxymethyl-[1,3,5]triazine-2,4,6-triamine, N',N''-(7-triethoxysilyl-2,4-diaza-3-oxo-heptyl)-N,N,N',N''-tetrakis-ethoxymethyl-[1,3,5]triazine-2,4,6-triamine, N-(5-triethoxysilyl-2-aza-2-methyl-pentyl)-N,N',N',N'',N''-pentakis-propoxymethyl-[1,3,5]triazine-2,4,6-triamine and N-(5-triethoxysilyl-2-aza-2-methyl-pentyl)-N,N',N',N'',N''-pentakis-phenoxymethyl-[1,3,5]triazine-2,4,6-triamine.

5. A process for preparing a hydrolyzable alkoxymethyl-amino-functional silane, comprising:
(i) contacting an amino resin having the structure of general Formula (VII) or (VIII),

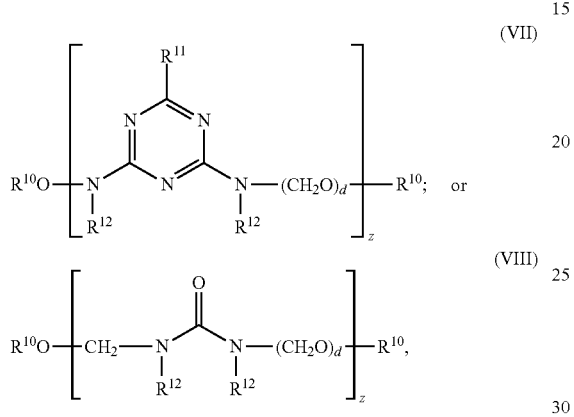

wherein
each $R^{10}$ is independently an alkyl group having from 1 to 10 carbon atoms, a cycloalkyl group having from 3 to 10 carbon atoms, alkenyl group having from 2 to 10 carbon atoms, an aryl group having from 6 to 12 carbon atoms, an aralkyl group having from 7 to 12 carbon atoms or hydrogen;
each $R^{11}$ is independently phenyl, —N(CH$_2$R$^{10}$)$_2$ or —NH(CH$_2$OR$^{10}$);
each $R^{12}$ is independently hydrogen or —CH$_2$R$^{10}$; and
each d and z is an integer, where d is 0 or 1 and z is from 1 to 40
each $R^{12}$ is —CH$_2$R$^{10}$,
with a silane containing a functional group having the general Formula (X):

$$(R^2O)_a R^3{}_{3-a} SiR_4 X^1 H \qquad (X)$$

wherein
each $R^2$ is independently hydrogen, an alkyl group having from 1 to 10 carbon atoms and optionally at least one oxygen atom, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms;
each $R^3$ is independently an alkyl group having from 1 to 3 carbon atoms or phenyl;
$R^4$ is an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms;

$X^1$ is —O—, —S—, —NR$^{13}$—, —NR$^{13}$C(=O)NR$^{13}$—, —where R$^{13}$ is hydrogen, an alkyl group having from 1 to 10 carbon atoms and optionally at least one oxygen atom, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms;
a is an integer equal to 0, 1 or 2, or
contacting an amino resin having the structure of general Formula (VII), (VIII) or (IX), where at least one $R^{12}$ is hydrogen or —CH$_2$OH, with a silane containing a functional group having the general Formula (XI):

$$(R^2O)_a R^3{}_{3-a} SiR_4 X^2 \qquad (XI)$$

wherein
each $R^2$ is independently hydrogen, an alkyl group having from 1 to 10 carbon atoms and optionally at least one oxygen atom, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms;
each $R^3$ is independently an alkyl group having from 1 to 3 carbon atoms or phenyl;
$R^4$ is an alkylene group having from 1 to 10 carbon atoms and optionally at least one oxygen atom, a cycloalkylene group having from 3 to 10 carbon atoms, an alkenylene group having from 2 to 10 carbon atoms, an arylene group having from 6 to 12 carbon atoms, an aralkylene group having from 7 to 14 carbon atoms;
$X^2$ is —Cl, —Br,

—N=C=O, —NR$^{13}$C(=O)NR$^{13}{}_2$ or —NR$^{13}$C(=O)OR$^{13}$ where R$^{13}$ is hydrogen, an alkyl group having from 1 to 10 carbon atoms and optionally at least one oxygen atom, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms;
a is an integer equal to 0, 1 or 2; and
(ii) reacting the amino resin of step (i) with the silane containing a functional group of step (i).

6. The process of claim 5, further comprising removing byproducts selected from the group consisting of $R^{10}$OH, $R^{13}{}_2$OH, $R^{13}{}_2$NH, HCl and HBr from the reaction mixture if the byproducts are formed in the reaction, wherein the molar ratio of the —X$^1$H group to the R$^{10}$OCH$_2$N— group or the —X$^2$ to R$^{12}$ group is from about 0.1 to about 0.8.

7. The process of claim 5, wherein the process is carried out in situ in a rubber composition comprising a rubber polymer (a) and a reinforcing filler (b) having water bound thereto, and wherein the silane containing a functional group forms silanols by reacting with water or water bound to the reinforcing filler and said silanols react with the reinforcing filler to form a plurality of covalent chemical bonds with the filler.

8. A rubber composition comprising:
(a) a rubbery polymer or blend of polymers;
(b) at least one reinforcing filler that is reactive with the hydrolyzable alkoxymethylamino-functional silane of claim 1;
(c) at least one organic resin;
(d) at least one hydrolyzable alkoxymethylamino-functional silane of claim 1;
(e) optionally, at least one active hydrogen containing organic compound; and
(f) optionally, at least one a sulfur-donating compound.

9. The rubber composition of claim 8, wherein the amount of alkoxymethylamino-functional silane (d) ranges from about 0.2 to about 20 weight percent based on the total weight of rubber composition, the rubbery component (a) ranges from about 25 to about 95 weight percent based on the total weight of the rubber composition, the reinforcing filler (b) that is reactive with the alkoxymethylamino-functional silane (d) ranges from about 2 to about 70 weight percent based on the total weight of rubber composition, the organic resin (c) ranges from about 0.2 to about 25 weight percent based on the total weight of the rubber composition, the active hydrogen-containing compound (e) ranges from about 0.2 to about 25 weight percent based on the total weight of the rubber composition and the amount of the sulfur-donating compound (f) ranges from about 0.2 to about 5 weight percent based on the total weight of the rubber composition.

10. A rubber composition comprising:
a combination of (i) a primary polymeric network comprising (a) a rubbery polymer or blend of polymers and (f) at least one sulfur-donating compound; and
(ii) a secondary polymeric network comprising the reaction product of (b) at least one reinforcing filler, (c) at least one organic resin, (d) at least one hydrolyzable alkoxymethylamino-functional silane of claim 1 and (e) at least one active hydrogen containing organic compound.

11. The rubber composition of claim 10, wherein the rubbery polymer (a) is selected from the group consisting of natural rubber (NR), synthetic polyisoprene (IR), polybutadiene (BR), various copolymers of butadiene, the copolymers of isoprene, solution styrene-butadiene rubber (SSBR), emulsion styrene-butadiene rubber (ESBR), ethylene-propylene terpolymers (EPDM), acrylonitrile-butadiene rubber (NBR), and functionalized rubbers that are modified by at least one alkoxysilyl group, tin-containing group, amino group, hydroxyl group, carboxylic acid group, polysiloxane group, epoxy group or phthalocyanimo group.

12. The rubber composition of claim 10, wherein the rubbery polymer (a) comprises natural rubber or a mixture of natural rubber and butadiene rubber.

13. The rubber composition of claim 10, wherein the reinforcing filler (b) before reaction with the other reactants of the secondary polymeric network is chosen from fibers, particulates or sheet-like structures comprising metalloid oxides or metal oxides having surface hydroxyl groups.

14. The rubber composition of claim 13, wherein the reinforcing filler (b) is selected from the group consisting of silicates, clays, ceramics, diatomaceous earth, pyrogenic silica, precipitated silica, titanium dioxide, aluminosilicate, alumina, talc and mixtures thereof.

15. The rubber composition of claim 13, wherein the reinforcing filler (b) comprises precipitated silica.

16. The rubber composition of claim 10, wherein the organic polymer (c) before reaction with the other reactants of the secondary polymeric network is selected from the group consisting of polyisocyanates, polyisocyanurates, epoxy resins, amino resins and polyurethanes.

17. The rubber composition of claim 16, wherein the amino resin has the chemical structure of Formulae (VII) or (VIII):

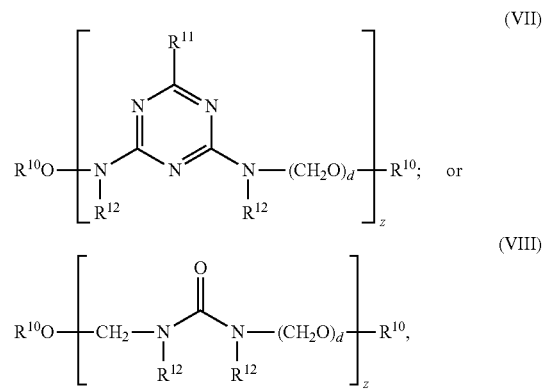

wherein
each $R^{10}$ is independently an alkyl group having from 1 to 10 carbon atoms, a cycloalkyl group having from 3 to 10 carbon atoms, alkenyl group having from 2 to 10 carbon atoms, an aryl group having from 6 to 12 carbon atoms, an aralkyl group having from 7 to 12 carbon atoms or hydrogen;
each $R^{11}$ is independently phenyl, —$N(CH_2R^{10})_2$ or —$NH(CH_2OR^{10})$;
each $R^{12}$ is independently hydrogen or —$CH_2OR^{10}$; and
each d and z is an integer, where d is 0 or 1 and z is 1 to 40.

18. The rubber composition of claim 16, wherein the amino resin is selected from the group consisting of 1,1,3,3-tetra-methoxymethylurea, 1,3,3-tris-methoxymethylurea, 1,3-bis-methoxymethylurea, 1,1-bis-methoxymethylurea, 1,1,3,3-tetra-ethoxymethylurea, 1,3,3-tris-ethoxymethylurea, 1,3-bis-ethoxymethylurea, 1,1-bis-ethoxymethylurea, 1,1,3,3-tetra-propoxymethylurea, 1,3,3-tris-propoxymethylurea, 1,3-bis-propoxymethylurea, 1,1-bis-propoxymethylurea, 1,1,3,3-tetra-butoxymethylurea, 1,1,3,3-tetra-phenoxymethylurea, N-(1,3,3-tris-ethoxymethylureidomethyl)-1,1,3,3-tetra-ethoxymethylurea, N, N'-bis-(1,1,3-tris-ethoxymethylureidomethyl)-1,3-bis-ethoxymethylurea, N, N'-bis-(1,1,3-tris-ethoxymethylureido-methoxymethyl)-1,3-bis-ethoxymethylurea, N,N,N',N',N'',N''-hexakis-methoxymethyl-[1,3,5]triazine-2,4,6-triamine, N,N,N',N',N''-pentakis-methoxymethyl-[1,3,5]triazine-2,4,6-triamine, N,N,N',N''-tetrakis-methoxymethyl-[1,3,5]triazine-2,4,6-triamine, N,N,N',N',N'',N''-hexakis-ethoxymethyl-[1,3,5]triazine-2,4,6-triamine, N,N,N',N',N''-pentakis-ethoxymethyl-[1,3,5]triazine-2,4,6-triamine, N,N,N',N''-tetrakis-ethoxymethyl-[1,3,5]triazine-2,4,6-triamine, N,N,N',N',N'',N''-hexakis-propoxymethyl-[1,3,5]triazine-2,4,6-triamine, N,N,N',N',N''-pentakis-propoxymethyl-[1,3,5]triazine-2,4,6-triamine, N,N,N',N''-tetrakis-propoxymethyl-[1,3,5]triazine-2,4,6-triamine, N,N,N',N',N'',N''-hexakis-phenoxymethyl-[1,3,5]triazine-2,4,6-triamine, N,N,N',N',N''-pentakisphenoxymethyl-[1,3,5]triazine-2,4,6-triamine and N,N,N', N"-tetrakis-phenoxymethyl-[1,3,5]triazine-2,4,6-triamine.

19. The rubber composition of claim 10, wherein the active hydrogen-containing organic compound (e) before reaction with the other reactants of the secondary polymeric network has the structure of Formula (XII):

wherein $R^{14}$ is a polyvalent organic group having from 1 to 100 carbon atoms or a polyvalent hydrocarbon containing 1 to 100 carbon atoms containing at least one heteroatom of oxygen or nitrogen; $X^3$ is —NH—, —$NR^{15}$—, —C(O)NH—, —C(=O)$NR^{15}$—, —NHC(=O)NH—, —NH(=O)$NR^{15}$—, —S—, —C(=O)O— or —O—, where $R^{15}$ is independently an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms, an aralkyl group having from 7 to 12 carbon atoms or hydrogen.

20. The rubber composition of claim 19, wherein $R^{14}$ contains at least one ether functional group, amino functional group, ester functional group, ketone functional group, aldehyde functional groups, amido functional groups, carbamato functional group or ureido functional group.

21. The rubber composition of claim 19, wherein the active hydrogen-containing organic compound (d) is selected from the group consisting of ethylene glycol, propylene glycol, 1,3-butanediol, diethylene glycol, triethylene glycol, polyethylene glycol having a molecular weight of from 194 to about 2000 grams/mole, dipropylene glycol, tripropylene glycol polypropylene glycol having a molecular weight of from 250 to 2500 grams/mole, glycerol, trimethylolmethane, trimethylolethane, trimethylolpropane and pentaerythritol, catechol, resorcinol, hydroquinone, phenol-formaldehyde resins, 2,2-bis(4-hydroxyphenyl)butane, 2,2-bis(4-hydroxyphenyl)propane, 1,1-bis(4-hydroxyphenyl)ethane, bis(4-hydroxyphenyl)methane, resorcinol-formaldehyde resins, ethylene diamine, diethylene triamine, triethylene tetraamine, bis-(2-aminoethyl)ether, 2-aminoethyl heptanamide, glycerol monostearate, sorbitan monostearate and urea formaldehyde resins.

22. The rubber composition of claim 10, wherein the sulfur-donating compound (f) is sulfur.

23. A rubber composition of claim 10, wherein the rubbery polymer (a) contains natural rubber; the reinforcing filler (b) before reaction with the other reactants of the secondary polymeric network is precipitated silica; the organic resin (c) before reaction with the other reactants of the secondary polymeric network is an amino resin having the structure of Formula (VII):

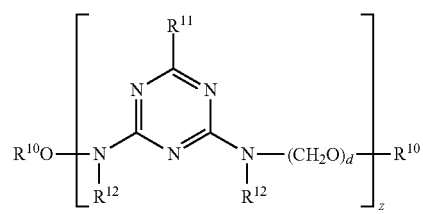

wherein $R^{10}$ is methyl, ethyl or propyl, $R^{12}$ is methoxymethyl, ethoxymethyl or propoxymethyl, $R^{11}$ is N,N-bis-(methoxymethyl)-aminomethyl, N,N-bis-(ethoxymethyl)-aminomethyl or N,N-bis-(propoxymethyl)-aminomethyl; the active hydrogen-containing compound (e) before reaction with the other reactants of the secondary polymeric network is catechol, resorcinol, hydroquinone, phenol-formaldehyde resins, 2,2-bis(4-hydroxyphenyl)butane, 2,2-bis(4-hydroxyphenyl)propane, 1,1-bis(4-hydroxyphenyl)ethane, bis(4-hydroxyphenyl)methane or resorcinol-formaldehyde resins; the hydrolyzable alkoxymethylamino-functional silane (d) before reaction with the other reactants of the secondary polymeric network has the structure of Formula (III):

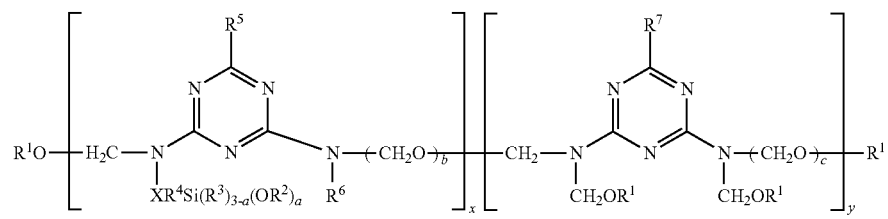

wherein $R^1$ is methyl, ethyl or propyl; $R^2$ is methyl, ethoxy or propyl, $R^3$ is methyl, $R^4$ is propylene; each $R^5$ and $R^7$ is N,N-bis-(methoxymethyl)-aminomethyl, N,N-bis-(ethoxymethyl)-aminomethyl or N,N-bis-(propoxymethyl)-aminomethyl, X is —$SCH_2$—; a is 2 or 3, x is 1, 2, 3, 4 or 5, and y is 0 or 1.

24. The rubber composition of claim 10, wherein before the reaction of components (b), (c), (d) and (e), the amount of alkoxymethylamino-functional silane (d) ranges from about 0.2 to about 20 weight percent based on the total weight of rubber composition, the reinforcing filler (b) that is reactive with the alkoxymethylamino-functional silane (d) ranges from about 2 to about 70 weight percent based on the total weight of rubber composition, the organic resin (c) ranges from about 0.2 to about 25 weight percent based on the total weight of the rubber composition and the active hydrogen-containing compound (e) ranges from about 0.2 to about 25 weight percent based on the total weight of the rubber composition.

25. A process for preparing the rubber composition of claim 10, comprising mixing, in a non-productive mixing step (i), components (a), (b) and (d) under reactive-mechanical-working conditions sufficient to bring about one or more of the following:
  (a) hydrolysis of the alkoxymethylamino-functional silane (d) with water, which is present on the reinforcing filler (b), to form alkoxymethylamino-functional silanols;
  (b) reaction of the silanols with the reinforcing filler (b) to form covalent chemical bonds with the filler;

(c) breakdown of agglomerates of the reinforcing filler (b) into smaller aggregates and/or individual filler particles; and, (d) dispersion of the reinforcing filler (b) covalently bonded to hydrolyzed and subsequently condensed alkoxymethylamino-functional silane (d) into the rubbery polymer (a);

mixing, in a non-productive mixing step (ii), component (c) and/or optional component (e) with the mixture of step (i) under reactive-mechanical-working conditions sufficient to bring about one or more of the following:

(e) dispersion of the organic resin (c) and active hydrogen-containing compound (e) into the mixture of the rubbery polymer (a), reinforcing filler (b), which is covalently bonded to the hydrolyzed and subsequently condensed alkoxymethylamino-functional silane of step (i);

(f) reaction of the reinforcing filler (b), which is covalently bonded to hydrolyzed and subsequently condensed alkoxymethylamino-functional silane, with the organic resin (c) or the active hydrogen-containing organic compound (e) or the organic resin (c) and the active hydrogen-containing compound (e); and (g) reaction of the organic resin (c) with the optional active hydrogen-containing organic compound (e) to form the secondary network dispersed within the primary network to provide an uncured rubber composition, with the proviso that the organic resin (c) or active-hydrogen-containing organic compound (e) can be added sequentially or together to the second non-productive mixing step (ii); and optionally, mixing, in optional step (iii), the sulfur-donating compound (f) with the mixture of step (ii).

26. The process of claim 25 further comprising a step (iv) in which the mixture of step (iii) is subjected to curing conditions of elevated temperature and time sufficient to cure the rubber composition.

27. A cured rubber composition of claim 10, wherein the primary polymeric network is crosslinked.

28. An article comprising the cured rubber composition of claim 27.

29. The article of claim 28, wherein said article is a component of a tire.

* * * * *